(12) United States Patent
Mankowski et al.

(10) Patent No.: US 12,319,170 B2
(45) Date of Patent: Jun. 3, 2025

(54) ELECTRIC VEHICLES WITH BATTERY MANAGEMENT AND SENSORS

(71) Applicant: ACCELERATED SYSTEMS INC., Waterloo (CA)

(72) Inventors: Peter Mankowski, Cambridge (CA); Willem Jager, Cambridge (CA); Lucas Malta Valle Coelho, Kitchener (CA)

(73) Assignee: Accelerated Systems Inc., Waterloo (CA)

(*) Notice: Subject to any disclaimer, the term of this patent is extended or adjusted under 35 U.S.C. 154(b) by 128 days.

(21) Appl. No.: 18/035,585

(22) PCT Filed: Nov. 12, 2021

(86) PCT No.: PCT/IB2021/060511
§ 371 (c)(1),
(2) Date: May 5, 2023

(87) PCT Pub. No.: WO2022/106971
PCT Pub. Date: May 27, 2022

(65) Prior Publication Data
US 2024/0083301 A1    Mar. 14, 2024

Related U.S. Application Data

(60) Provisional application No. 63/114,584, filed on Nov. 17, 2020.

(51) Int. Cl.
*B60L 58/18*    (2019.01)
*B60L 7/10*    (2006.01)
(Continued)

(52) U.S. Cl.
CPC ............... *B60L 58/18* (2019.02); *B60L 7/10* (2013.01); *B60L 15/2009* (2013.01);
(Continued)

(58) Field of Classification Search
CPC ...... B60L 58/12; B60L 58/19; B60L 2260/24; B60L 15/2009; B60L 58/18; H02J 7/1423
See application file for complete search history.

(56) References Cited

U.S. PATENT DOCUMENTS

| 2004/0021437 A1 | 2/2004 | Maslov |
| 2015/0217768 A1 | 8/2015 | Fairgrieve |

(Continued)

FOREIGN PATENT DOCUMENTS

| CA | 3073575 A1 | 3/2019 | |
| CN | 106080223 A * | 11/2016 | .............. B60L 50/40 |

(Continued)

OTHER PUBLICATIONS

CN-106080223-A machine translation (Year: 2016).*

(Continued)

*Primary Examiner* — Hussein Elchanti
*Assistant Examiner* — Kenneth M Dunne

(57) ABSTRACT

Electric vehicles with battery management and sensors are provided. An electric vehicle may be configured to charge individual main batteries using individual intermediate batteries while the electric vehicle is in operation via suitable control of switches. An electric vehicle may be configured to charge batteries using a regeneration current based on sensor data from sensors, such one or more of a camera, an accelerometer, a gyroscope an atmospheric pressure sensor and a Hall sensor. An electric vehicle may be configured to avoid rear end collisions based on images from a rear-facing camera.

20 Claims, 12 Drawing Sheets

(51) Int. Cl.
  *B60L 15/20* (2006.01)
  *B60L 50/60* (2019.01)
  *B60L 58/12* (2019.01)
  *H02J 7/14* (2006.01)

(52) U.S. Cl.
  CPC .............. *B60L 50/60* (2019.02); *B60L 58/12* (2019.02); *H02J 7/1423* (2013.01); *B60L 2240/14* (2013.01); *B60L 2260/24* (2013.01)

(56) References Cited

U.S. PATENT DOCUMENTS

| | | |
|---|---|---|
| 2016/0114696 A1 | 4/2016 | Eifert et al. |
| 2017/0036547 A1 | 2/2017 | Mizui |
| 2019/0250623 A1 | 8/2019 | Kentley-Klay et al. |
| 2019/0256076 A1 | 8/2019 | Roiu et al. |
| 2020/0055405 A1 | 2/2020 | Duan et al. |

FOREIGN PATENT DOCUMENTS

| | | | | |
|---|---|---|---|---|
| WO | WO-2014068919 A1 * | 5/2014 | .............. | B60L 1/003 |
| WO | 2020034556 A1 | 2/2020 | | |
| WO | 2020074397 A1 | 4/2020 | | |

OTHER PUBLICATIONS

WO-2014068919-A1 machine translation (Year: 2014).*

"International Search Report" mailed Jan. 27, 2022, issued in corresponding PCT Application No. PCT/IB2021/060511, filed Nov. 12, 2021.

Myersdorf, Doron, "How AI is Unlocking Battery Technology That Will Power the Future of Electric Vehicles", E&T: Magazine, https://web.archive.org/web/20191029055958/https://eandt.theiet.org/content/articles/2019/08/how-ai-is-unlocking-battery-technology-that-will-power-the-future-of-electric-vehicles/, Oct. 29, 2029.

Oliver, Suzanne, "Electric-Car Batteries Get a Boost From Artificial Intelligentce", Journal Reports: Technology, https://web.archive.org/web/20201115231120/https://www.wsj.com/articles/electric-car-batteries-get-a-boost-from-artificial-intelligence-11604422792; Nov. 15, 2020.

Stanford University: SciTechDaily, Feb. 22, 2020, ttps://web.archive.org/web/20201108131311/https://scitechdaily.com/artificial-intelligence-used-to-supercharge-battery-development-for-electric-vehicles/, Nov. 8, 2020.

Infineon Technologies: Battery Monitoring and Cell Balancing; https://web.archive.org/web/20201116144237/https://www.infineon.com/cms/en/applications/solutions/battery-management-system/battery-balancing/, Nov. 16, 2020.

* cited by examiner

ELECTRIC VEHICLES WITH BATTERY MANAGEMENT AND SENSORS

BACKGROUND

Electric vehicles are becoming a popular mode of transportation. Such electric vehicles generally include batteries that degrade over time. Furthermore, such electric vehicles may encounter dangerous situations.

BRIEF DESCRIPTIONS OF THE DRAWINGS

For a better understanding of the various examples described herein and to show more clearly how they may be carried into effect, reference will now be made, by way of example only, to the accompanying drawings in which.

DETAILED DESCRIPTION

Electric vehicles are becoming a popular mode of transportation. Such electric vehicles generally include batteries that degrade over time. Furthermore, such electric vehicles may encounter various environments that may cause regeneration power to be generated and/or may cause dangerous situations to occur, but the electric vehicles may not be configured to respond accordingly. Furthermore, in many electric vehicles, only an entire battery pack is charged; individual batteries are not charged while other batteries are used to power the electric vehicles, which may lead to uneven charging and/or uneven charging degradation of batteries in a battery pack.

Figure 1:
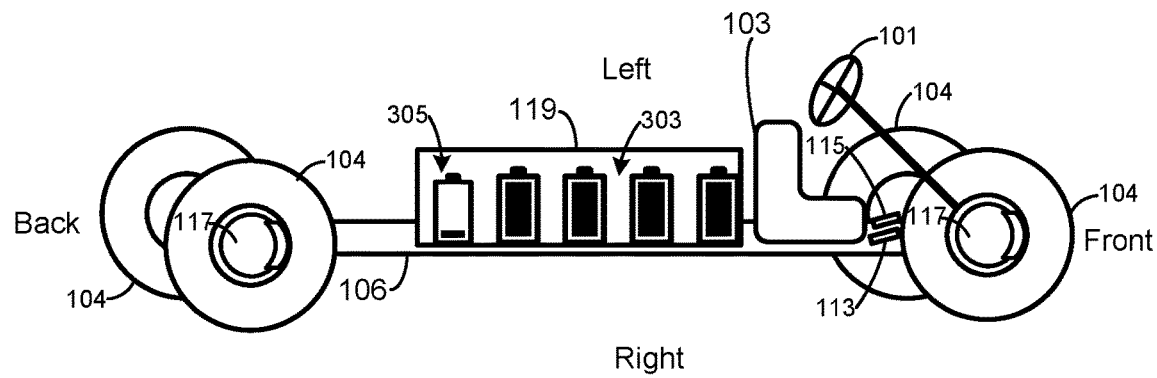
FIG. 1 depicts a side view of a vehicle with battery management and sensors, according to non-limiting examples.
Figure 2:
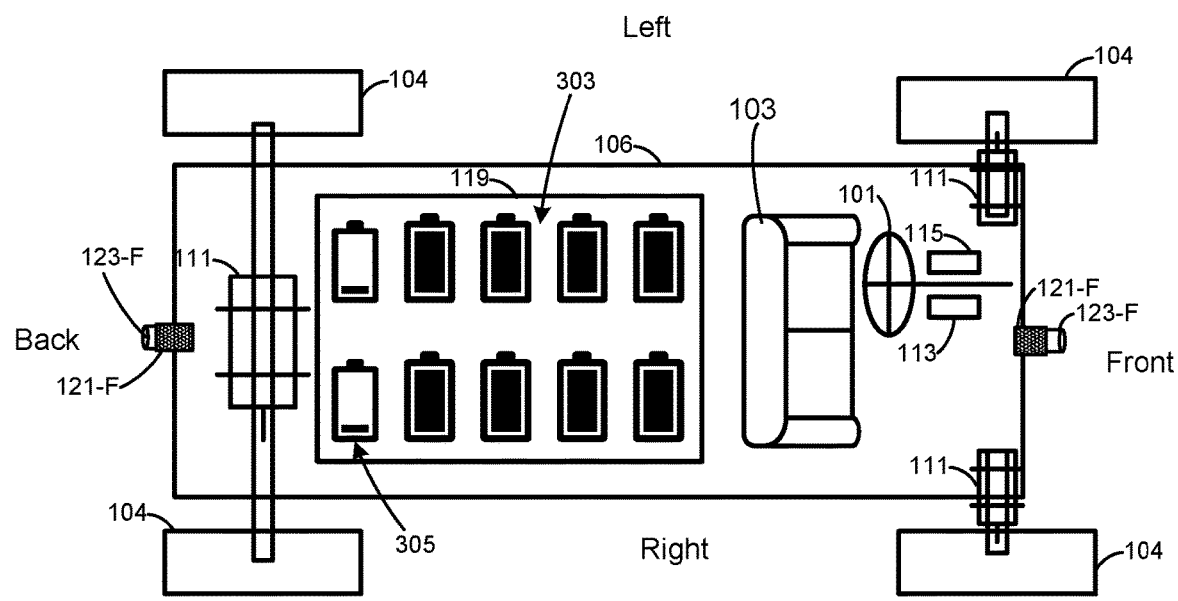
FIG. 2 depicts a top view of the vehicle with battery management and sensors, according to non-limiting examples.

FIG. 1 and FIG. 2 schematically depict a side and top view of an electric vehicle 100. The electric vehicle 100 is interchangeably referred to hereafter as the vehicle 100.

With reference to FIG. 1 and FIG. 2, as depicted, the vehicle 100 comprises a cart and/or a golf cart, and the like, that includes steering wheel 101 (depicted in perspective in FIG. 1 to show details thereof), a seat 103 for an operator (not depicted), front and rear wheels 104, and a chassis 106 (e.g. in the form of platform, and the like, for the cart). For clarity, in FIG. 1 and FIG. 2, front, back, left and right directions of the vehicle 100 are indicated; for example, the steering wheel 101 is located towards the front at the vehicle 100, and the left and right sides are relative to an operator sitting on the seat 103 facing the front of the vehicle 100. Put another way, the vehicle 100 and/or the chassis 106 is understood to include a front end and rear end. It is understood that not all parts of the chassis 106, are depicted; for example, parts of the chassis 106, such as panels, covers, and the like, are removed in FIG. 1 and FIG. 2 to show certain components of the vehicle 100 as described hereafter.

For example, as best seen in FIG. 2, as the vehicle 100 is electric, the vehicle 100 further comprises at least one electric motor 111; for example, as depicted the vehicle 100 comprises three electric motors 111 that are attached to the chassis 106, with one rear electric motor 111 driving the rear wheels 104, and two front electric motors 111 driving the front wheels 104, for example one front electric motor 111 per front wheel 104. However, the vehicle 100 may include as few as one electric motor 111 and/or any suitable number of electric motors 111. Hence, while hereafter references will be made to one electric motor 111 at the vehicle 100, it is understood that the vehicle 100 may comprise any suitable number of electric motors 111, with processes and methods described hereafter being used to control the any suitable number of electric motors 111. Furthermore, hereafter, the electric motor 111 is interchangeably referred to hereafter as the motor 111.

As depicted, the vehicle 100 further comprise a motion controller 113 (e.g. an actuator) for controlling the motor 111, as well as a brake controller 115 for controlling brakes 117 (e.g. as depicted, disc brakes at the wheels 103) of the vehicle 100. As depicted, the motion controller 113 and the brake controller 115 are located adjacent the seat 100 (e.g. under the steering wheel 101), and may be in the form of pedals, and the like, and may be manually operated by an operator of the vehicle 100.

While not depicted in FIG. 1 and FIG. 2, it is understood that the vehicle 100 further comprises a motor controller, a controller and/or processor, and/or any other suitable components for controlling the motor. Such components will be described in more detail with respect to FIG. 3. However, it is understood that such components may be at least partially be contained at a housing 119 in a portion of the chassis 106, with wiring to the motor 111 (and/or motors 111) through the chassis 106 and/or in any suitable position (e.g. outside and/or through the chassis 106, and the like). Furthermore, as schematically depicted in FIG. 1 and FIG. 2, batteries 303, 305 may be contained in the housing 119, the batteries for powering the vehicle 100 (e.g. the motor 111 and/or motors 111), as described in more detail with respect to FIG. 3.

While depicted as a cart, the vehicle 100 may comprise any other suitable type of electric vehicle, which may be operated by an operator and/or operated autonomously. For example, the vehicle 100 may include, but is not limited to, a car (of any suitable type), a truck, a van, a delivery vehicle, the depicted bicycle, a tricycle, a quadracycle, a golf cart, an all-terrain vehicle (ATV), a motorcycle, an e-bike, a snowmobile, a farming vehicle, an agricultural vehicle, a construction vehicle, a boat, a submarine, an airplane, and/or any other suitable vehicle for human transportation that includes an electric power source (e.g. batteries) and an electric motor, and the like; however, the vehicle 100 may alternatively comprise vehicles with electric power source that are not for human transportation including, but not limited to, a land-based drone, a flying drone, a boat drone, a submarine drone, a robot, an industrial robot, an agricultural robot, a cleaning robot, a personal assistant robot and/or robot, and the like. Furthermore, components that move the vehicle 100 may include wheels, treads, propellers, propulsion devices, robotic legs, and the like, for example driven by the electric motor 111.

As such, the depicted components may be replaced by any suitable components depending on a type of the vehicle 100. For example, the steering wheel 101 may be replaced with handlebars, the motion controller 113 and brake controller 115 replaced with hand-operated devices, etc. (and/or the motion controller 113 and the brake controller 115 may be optional when the vehicle 100 is autonomous).

As best seen in FIG. 2, the vehicle 100 further comprises one or more sensors 121 (e.g. rear sensor(s) 121-R and front sensor(s) 121-F) which may comprise one or more of a camera, an accelerometer, a gyroscope, an atmospheric pressure sensor and a Hall sensor. The sensors 121 may be provided in any suitable combination to generally to sense an environment around the vehicle 100 and/or motion of the vehicle 100, including, but not limited to, landscape and/or elevation around the vehicle 100, objects (e.g. such as other vehicles, persons, baby carriages, animals, and the like) around the vehicle 100, as well as acceleration, velocity, and the like of the vehicle 100. Furthermore while all the sensors 121 are depicted in given locations (e.g. at a front and rear of the vehicle), sensors 121 of the vehicle 100 may be provided in any suitable location; for example, one or more Hall sensors may be located at the motor 111 of the vehicle 100. Similarly, the one or more of the motion controller 113 and the brake controller 115 may comprise sensors (e.g. an acceleration sensor and a braking sensor) to detect deceleration (or acceleration) and/or braking of the vehicle 100.

In a particular example, the one or more sensors 121 comprise a rear-facing camera 123-R (e.g. a digital camera, a charge-coupled device (CCD) based camera, Complementary metal-oxide-semiconductor (CMOS) based camera, and the like) having a field of view that enables the rear-facing camera 123-R to acquire images in a rearward direction and which may include, but are not limited to, images of other vehicles approaching the vehicle 100 from behind. However, it is understood that the field of view of the rear-facing camera 123-R generally includes a "visual angle" and may depend on lenses (e.g. focal lengths thereof), sizes of imaging sensors (e.g. a size of a CCD and/or a CMOS sensor), and the like of the rear-facing camera 123-R; in a particular example, the rear-facing camera 123-R may image at an angle of up to 35° on either side of a normal to a front lens of the rear-facing camera 123-R, however the rear-facing camera 123-R may image at any suitable angle.

As depicted, the one or more sensors 121 may further comprise a front-facing camera 123-F having a field of view that enables the front-facing camera 123-F to acquire images in a forward direction and/or a direction of movement of the vehicle 100 (e.g. presuming the vehicle 100 is not reversing, in which case the rear-facing camera 123-R acquire images in a rearward direction and/or a rearward direction of movement of the vehicle 100). The front-facing camera 123-F may image in a similar manner, at a same, or different angle as the rear-facing camera 123-R. The cameras 123-R, 123-F are interchangeably referred to hereafter, collectively, as the cameras 123 and, generically, as a camera 123; a similar convention will be used throughout the present specification.

The cameras 123 may include, but are not limited to, one or more of, Red-Green-Blue (RGB) cameras, depth cameras, stereoscopic cameras, thermal cameras, infrared (IR) cameras, and the like.

In a particular example, the one or more sensors 121 may comprise the cameras 123 (and/or at least the rear-facing camera 123-R), and a combination of sensors that includes one or more of an accelerometer, a gyroscope an atmospheric pressure sensor, a Hall sensor, a braking sensor, and an acceleration sensor; sensor data from such a combination may enable processors, and the like, at the vehicle to determine speed, acceleration, changes in elevation, and the like, of the vehicle 100 (e.g. without relying on a more costly Global Positioning System (GPS) device, and/or any other suitable location determining device, and the like, however the sensors 121 may include such a location determining device, and the like).

The one or more sensors 121 may include any other suitable sensors including, but not limited to, any suitable combination of ultrasonic sensors, radar (Radio Detection and Ranging) devices, laser devices (e.g. Light Detection and Ranging (LiDAR) devices), and the like.

While not depicted in FIG. 1 (however see FIG. 3), the vehicle 100 may further comprise notification devices, such as microphones, display screens, haptic devices, and the like, for notifying an operator of the vehicle 100 of various states of the vehicle 100 and/or of an environment of the vehicle and/or objects around the vehicle. Alternatively, the vehicle 100 may further comprise a communication interface for wirelessly communicating with a notification device (e.g. a mobile device, a cell phone and the like) operated by a user of the vehicle 100, for example to wirelessly transmit notifications of various states of the vehicle 100, and the like, to the notification device.

As will next be described, the vehicle 100 is generally configured to manage batteries 303, 305 thereof, for example to increase a life of the batteries and/or to maintain a similar state of charge between such batteries. The vehicle 100 may be further configured to control regeneration charging of the batteries 303, 305 based on sensor data from the one or more sensors 121. The vehicle 100 may be further configured to predict collisions with other vehicles approaching from the rear, using images from the rear-facing camera 123-R and accelerate away from the other vehicles.

Figure 3:
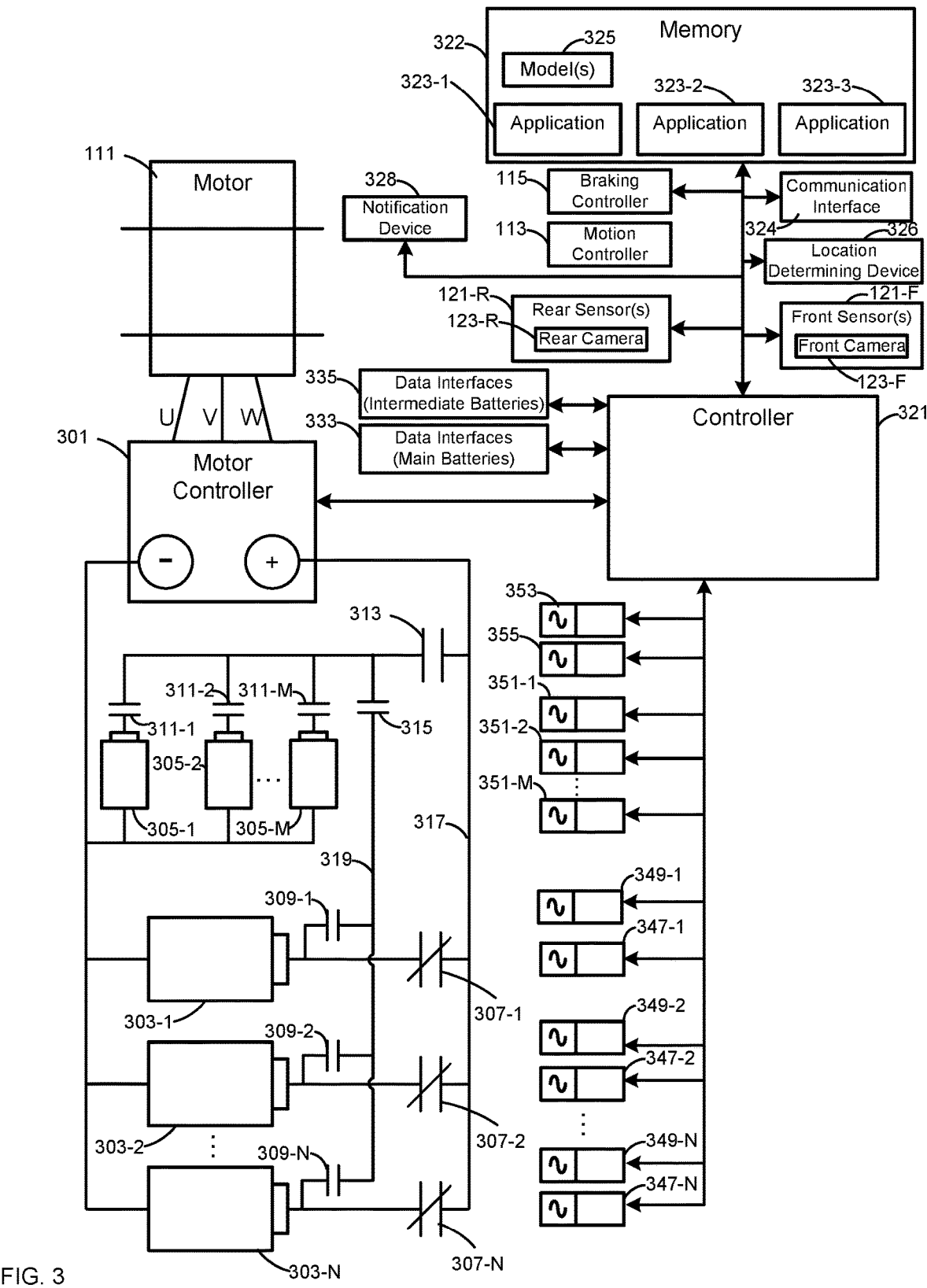
FIG. 3 depicts a block diagram of electronic components of the vehicle of FIG. 1, including batteries thereof, according to non-limiting examples.

Attention is next directed to FIG. 3 which depicts a schematic block diagram of electronic components of the electric vehicle 100, a portion of which may be contained in the housing 119.

For clarity, data connections between components in FIG. 3 are depicted as double-ended arrows, while electrical/power connections are depicted as lines (e.g. without arrows).

As depicted, the vehicle 100 comprises a motor controller 301 electrically connected to the motor 111 via "UVW" connections (e.g. to different phases of the motor 111). As depicted, the motor controller 301 comprises electrically positive ("+") and negative ("−") connectors which connect to batteries, as described hereafter.

In general, motor controller 301 is configured to: control the motor 111; and detect when the motor 111 is generating current, for example when the vehicle 100 is coasting (e.g. with power not being supplied to the motor 111), rolling down hill, and the like. Put another way, the motor controller 301 may provide power to the motor 111 and/or the motor controller 301 may receive power (and/or current) from the motor 111. When the motor 111 is generating power (and/or current), such power (and/or current) may be used to charge batteries of the vehicle 100 and may be referred to as regeneration power (and/or regeneration current).

For example, as depicted, vehicle 100 further comprises main batteries 303-1, 303-2 . . . 303-N (e.g. main batteries 303 and/or a main battery 303) configured to: provide power to the motor 111 via the motor controller 301; and monitor respective states of charge thereof, as well as any other suitable parameters. While three main batteries 303 are depicted (e.g. "N"=3), the vehicle 100 may comprise any suitable number of main batteries 303.

However, as depicted, vehicle 100 further comprises intermediate batteries 305-1, 305-2 . . . 305-M (e.g. intermediate batteries 305 and/or an intermediate battery 305) configured to: store regeneration power generated via current generated by the motor 111. While three intermediate batteries 305 are depicted (e.g. "M"=3), the vehicle 100 may comprise any suitable number of intermediate batteries 305, which may be a same number, or different number of the main batteries 303 (e.g. "N" and "M" may be the same or different). The batteries 303, 305 are understood to correspond to the batteries in the housing 119 depicted in FIG. 1 and FIG. 2.

As depicted, the vehicle 100 further comprises various switches 307-1, 307-2, . . . 307-N (e.g. switches 307 and/or a switch 307), 309-1, 309-2, . . . 309-N (e.g. switches 309 and/or a switch 309), 311-1, 311-2, . . . 311-N (e.g. switches 311 and/or a switch 311), 313, 315. The switches 307 are to respectively control power to and from the main batteries 303, the switches 311 are to respectively control power to and from the intermediate batteries 305, and the switches 311 are to respectively control power between individual main batteries 303 and the intermediate batteries 305. The switch 313, which may be optional, is to control power between the main batteries 303 and the intermediate batteries 305 on a primary power line 317, and the switch 315, which may be optional, is to control power between the main batteries 303 and the intermediate batteries 305 on a secondary power line 319.

As represented in FIG. 3, a switch 307, 309, 311, 313, 315 is understood to be closed when a line is through a switch 307, 309, 311, 313, 315, and open when a line is not through a switch 307, 309, 311, 313, 315. For example, as depicted the switches 307 are all closed, and the switches 309, 311, 313, 315 are all open; as such, the main batteries 303 are understood to be providing power to the motor controller 301 on the primary power line 317, which provides the power to the motor 111, and the intermediate batteries 305 are understood to be isolated from the primary power line 317, the main batteries 303 and the motor controller 111. The primary power line 317 is hence understood to provide power to (and from) the motor controller 301, and the secondary power line 319 is understood to provide power between the batteries 303, 305 (e.g. to use the intermediate batteries 305 to charge the main batteries 303 while the vehicle is in operation).

As depicted, the main batteries 303 are connected in parallel with each other and the motor controller 301, the intermediate batteries 305 are connected in parallel with each other, and, as a group, the intermediate batteries 305 are connected in parallel with the main batteries 303 and the motor controller 301.

Furthermore, as the switches 307 are provided in series with, and in a one-to-one correspondence with, respective main batteries 303 (e.g. there are "N" switches 307, one for each of the main batteries 303). Similarly, the switches 311 are provided in series with, and in a one-to-one correspondence with, respective intermediate batteries 305 (e.g. there are "M" switches 307, one for each of the intermediate batteries 305). Hence, at least the switches 307, 311 may be controlled to connect and disconnect the batteries 303, 305 with each other and/or the motor controller 301 on the primary power line 319.

Similarly, as the switches 309 are provided in series with, and in a one-to-one correspondence with, respective main batteries 303 (e.g. and in parallel with the switches 307), at least the switches 309, 311 may be controlled to connect and disconnect individual batteries 303, 305 with each other on the secondary power line 319.

Furthermore, a switch 307 may be controlled (e.g. opened) to isolate a corresponding main battery 303 from the primary power line 317, while a corresponding switch 309 may be controlled (e.g. closed) to connect the corresponding main battery 303 to the secondary power line 319 and hence to one or more of the intermediate batteries 305, for example via the switch 313 being open, and one or more of the switches 311 being closed.

However, the switch 313 may be controlled to connect and disconnect the batteries 303, 305 with each other and/or to connect and disconnect the intermediate batteries 305 with the motor controller 301 on the primary power line 319.

Similar, the switch 315 may be controlled to connect and disconnect the batteries 303, 305 with each other on the secondary power line 319.

The batteries 303, 305 may comprise any suitable batteries and/or power cells, and the like, including, but not limited to, lithium batteries and/or cells, and the like. Furthermore, the main batteries 303 may be provided as a main battery pack, and the intermediate batteries 305 may be provided as an intermediate battery pack; the various switches 307, 309, 311 may be provided as components of suitable battery packs and/or external to such battery packs.

Regardless of a format of the batteries 303, 305, it is understood that the batteries 303, 305 may be exchangeable for other respective batteries 303, 305. Hence, the batteries 303, 305 may comprise removable and/or exchangeable batteries.

In some examples, the main batteries 303 may have a higher energy storage capacity than the intermediate batteries 305. As will be described hereafter, the main batteries generally provide a main source of power to the motor controller 301, and the intermediate batteries 305 may be used to store regeneration power, which may be used to dynamically charge the main batteries 303, for example while the vehicle 100 is in operation via controlling various switches 307, 309, 311, 313, 315. For example, when the motor 111 is producing regeneration power, one or more of the switches 311 may be closed, the switch 313 may also be closed, and the remaining switches 307, 309, 315 may be opened to direct the regeneration power to one or more the intermediate batteries 305; which switches 311 are closed or open, to charge or not, respective intermediate batteries 305 may depend on a state of charge of the intermediate batteries 305, as described below.

When the motor 111 stops producing the regeneration power, closed switches 311 may be open, the switch 313 may also be open, and the switches 307 may be closed such that the main batteries 303 again direct power to the motor controller 301.

In some examples, all regeneration power may be directed to one or more of the intermediate batteries 311 by controlling the switches 307, 309, 311, 313, 315 accordingly, for example to also prevent regeneration power being used to charge the main batteries 303; such examples may be implemented to prevent the main batteries 303 from being damaged by charging via regeneration power. In other examples, however, the regeneration power may alternatively be directed to one or more of the main batteries 303 to charge them by suitably controlling various switches 307, 309, 311, 313, 315 to close (or open).

As depicted the vehicle 100 further comprises a controller 321 to control, amongst other possibilities described herein, the various switches 307, 309, 311, 313, 315. The controller 321 may comprise a processor and/or a plurality of processors, including but not limited to one or more central processors (CPUs), one or more microprocessors, and/or one or more graphics processing units (GPUs) and/or one or more processing units. Regardless, the controller 321 comprises a hardware element and/or a hardware processor. Indeed, in some implementations, the controller 321 can comprise an ASIC (application-specific integrated circuit) and/or an FPGA (field-programmable gate array) specifically configured for implementing functionality as described herein. Hence, the controller 321 may not be a generic controller, but a device specifically configured to implement specific functionality as described herein. For example, the controller 321 can specifically comprise a computer executable engine configured to implement functionality of blocks of the methods described with respect to FIG. 4, and/or FIG. 7 and/or FIG. 9 and/or FIG. 11.

As depicted the controller 321 is communicatively coupled to various components of the vehicle 100, for example via wired (or wireless) communication links and/or a computer bus, and the like.

For example, as depicted, the controller 321 is communicatively coupled to the motion controller 113, the braking controller 115, the sensors 121, the cameras 123, as well as a memory 322 storing one or more applications 323-1, 323-2, 323-3 (e.g. applications 323 and/or an application 323), a communication interface 324, a location determining device 326, at least one notification device 328, and data interfaces 335, 335 of the batteries 303, 305 and interfaces of the switches 307, 309, 311, 313, 315. As depicted, the memory 322 further stores one or more given models 325 for the main batteries 303, as described in more detail below.

The memory 322 may comprise a non-volatile storage unit (e.g. Erasable Electronic Programmable Read Only Memory ("EEPROM"), Flash Memory) and a volatile storage unit (e.g. random-access memory ("RAM")). However, the memory 322 may be provided in any suitable manner including, but not limited to, as a cloud-based memory. Programming instructions that implement the functional teachings of the controller 321 as described herein are typically maintained, persistently, in the memory 322 and used by the controller 321 which makes appropriate utilization of volatile storage during the execution of such programming instructions. Those skilled in the art recognize that the memory 322 is an example of computer readable media that can store programming instructions executable on the controller 321. Furthermore, the memory 322 is also an example of a memory unit and/or memory module and/or a non-volatile memory.

The communication interface 324 comprises any suitable wired or wireless communication interface including, but not limited to a, WiFi™ communication interface, a Bluetooth™ communication interface, a cell phone communication interface, and the like.

Communication between the controller 321, data interfaces 333, 335 of the batteries 303, 305 and interfaces of the switches 307, 309, 311, 313, 315 are next described.

In particular, the batteries 303, 305 generally comprise "smart" batteries configured to monitor various electrical parameters thereof, including, but not limited to, charge capacity, stored power and/or voltage, current, and the like. Such parameters may generally be related to "health" and/or lifetime of a battery 303, 305. The batteries 303, 305 are hence understood to include respective data interfaces 333, 335 which may report such parameters to the controller 321. While data interfaces 333, 335 of the batteries 303, 305 are depicted as being separate from the batteries 303, 305, such data interfaces 333, 335 are understood to be components of the batteries 303, 305. Furthermore, while the data interfaces 333 for the main batteries 303 are depicted as bundled together, it is understood that there may be a data interface 333 for each of the main batteries 303, though, in other examples, there may be one or more data interfaces 333 for a battery pack of the main batteries 303. Similarly, while the data interfaces 335 for the intermediate batteries 305 are depicted as bundled together, it is understood that there may be a data interface 335 for each of the intermediate batteries 305, though, in other examples, there may be one or more data interfaces 335 for a battery pack of the intermediate batteries 305.

Similarly, the switches 307, 309, 311, 313, 315 comprise respective data interfaces to the controller 321, and the controller 321 may open and close a switch 307, 309, 311, 313, 315 via a respective data interface. Similar to the data interfaces 333, 335, while data interfaces of the switches 307, 309, 311, 313, 315 are depicted as being separate from the switches 307, 309, 311, 313, 315, such data interfaces are understood to be components of the switches 307, 309, 311, 313, 315.

For example, the switches 307 comprise respective data interfaces 347-1, 347-2, . . . 347-N (e.g. the interfaces 347 and/or an interface 347), the switches 309 comprise respective data interfaces 349-1, 349-2, . . . 349-N (e.g. data interfaces 349 and/or a data interface 349), the switches 311 comprise respective data interfaces 351-1, 351-2, . . . 351-N (e.g. data interfaces 351 and/or a data interface 351), and the switches 313, 315 comprise respective data interfaces 353, 355.

For example, the switches 307, 309, 311, 313, 315 may comprise power field effect transistors (PFETs) and the various interfaces 347, 349, 351, 353, 355 may comprise gates of the PFETs and opening and closing of the switches 307, 309, 311, 313, 315 may comprise the controller 321 removing and applying power to the gates to open or close electrical connections between a source and gate thereof. As such, it is understood that the electrical components of the vehicle 100 may be powered by the main batteries 303 (and/or the intermediate batteries 305) using electrical connections not depicted herein (and/or the batteries 303, 305 may power their own respective switches). However, the switches 307, 309, 311, 313, 315 may include any suitable types of switches.

As mentioned above, the memory 322 stores applications 323 that, when processed by the controller 321, enables the controller 321 to implement specific functionality and/or different functionality.

For example, the application 323-1 may comprise a battery management application that, when processed by the controller 321, enables the controller 321 to: based on the respective states of charges of the main batteries 303 (e.g. reported to the controller 321 via the data interface 333), control the switches 307, 309, 311, 313, 315 (and/or a subset thereof) to: disconnect one or more of the main batteries 303 from the motor controller 301 while a given number of the main batteries 303 continue to provide the power to the motor 111 via the motor controller 301; and connect the one or more of the main batteries 303 to the intermediate batteries 305 until the respective states of charges of the main batteries 303 are within a given range.

The application 323-2 may comprise a sensor-based battery charging application that, when processed by the controller 321, enables the controller 321 to: receive sensor data from the one or more sensors 121; and based on the sensor data meeting one or more given conditions, control the switches 307, 309, 311, 313, 315 (and/or a subset thereof) into a regeneration state, such that one or more of the batteries 303, 305 is being charged via current generated by the motor 111, wherein such charging brakes the motor 111.

The application 323-3 may comprise a rear collision avoidance application that, when processed by the controller 321, enables the controller 321 to: receive images from the rear camera 123-R; determine, from the images, that an other vehicle (e.g. a second vehicle with the vehicle 100 being a first vehicle) is approaching a rear end of the chassis 106 and/or the vehicle 100; predict, from the images, a possible collision with the other vehicle at the rear end of the chassis 106 and/or the vehicle 100; and, in response, control the motor 111 to accelerate the chassis 106 and/or the vehicle 100 away from the other vehicle to one or more of avoid and minimize the possible collision.

It is further understood that as few as one of the applications 323 may be implemented at the vehicle 100, and/or another vehicle, and/or any suitable combination of the applications 323 may be implemented at the vehicle 100, and/or another vehicle, with hardware components thereof adapted accordingly. For example, when the application 323-1 is implemented at a vehicle, and not the applications 323-2, 323-3, the sensors 121 may be optional.

The applications 323 may include respective numerical algorithms, and/or programmed algorithms, predetermined algorithms, and/or static algorithms configured to determine when to charge batteries and/or accelerate a vehicle.

Alternatively, and/or in addition to numerical algorithms, and/or programmed algorithms, predetermined algorithms, and/or static algorithms, the applications 323 may include machine learning models and/or algorithms, and the like, which have been trained when to charge batteries and/or accelerate a vehicle. Furthermore, in these examples, the application 323 may initially be operated by the controller 321 in a training mode to train the machine learning models and/or algorithms of the application 323 to perform the above described functionality and/or generate classifiers therefor.

The one or more machine learning models and/or algorithms of the application 323 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like.

However, as data stored by the controller 321 may later be used in court proceedings, generalized linear regression algorithms, random forest algorithms, support vector machine algorithms, gradient boosting regression algorithms, decision tree algorithms, generalized additive models, and the like may be preferred in present examples over neural network algorithms, deep learning algorithms, evolutionary programming algorithms, and the like. In particular, generalized linear regression algorithms, random forest algorithms, support vector machine algorithms, gradient boosting regression algorithms, decision tree algorithms, generalized additive models, and the like may be preferred in some public safety environments, such as courts. Regardless, any suitable machine learning algorithm and/or deep learning algorithm and/or neural network is within the scope of present examples.

Figure 4:
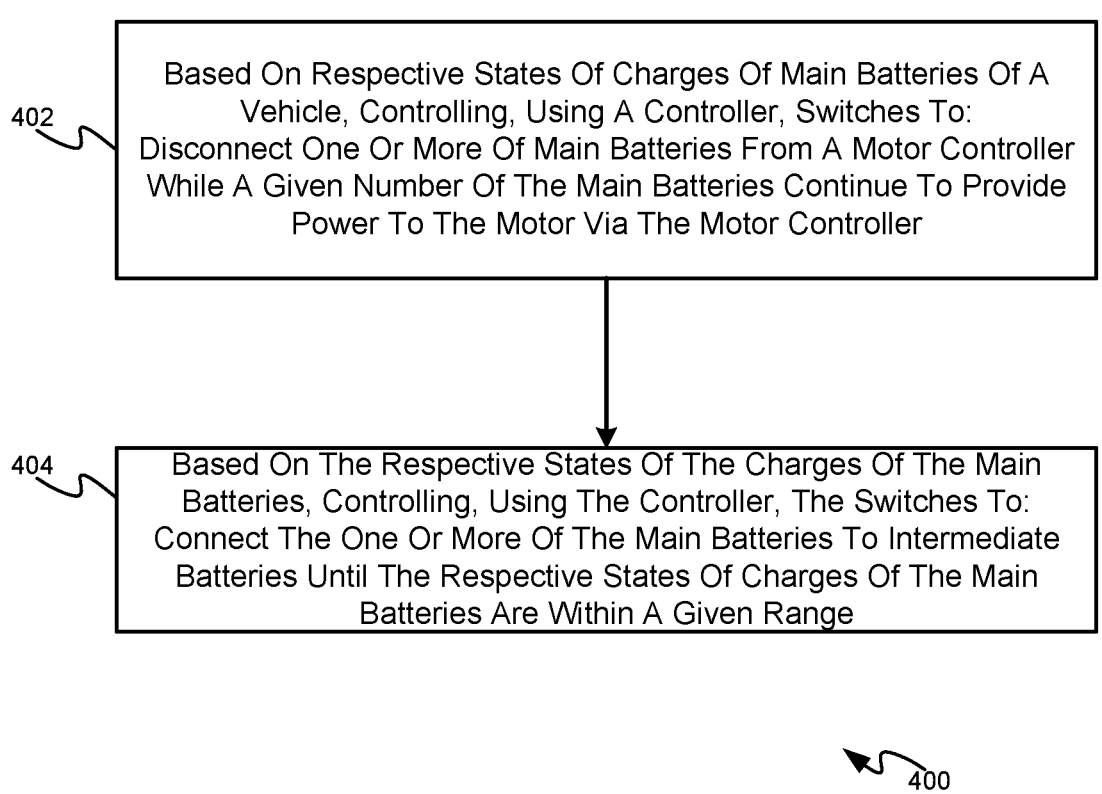
FIG. 4 depict a flowchart of a method for battery management in the vehicle of FIG. 1, according to non-limiting examples.

Attention is now directed to FIG. 4 which depicts a flowchart representative of a method 400 for battery management. The operations of the method 400 of FIG. 4 correspond to machine readable instructions that are executed by the controller 321. In the illustrated example, the instructions represented by the blocks of FIG. 4 are stored at the memory 322 for example, as the application 323-1. The method 400 of FIG. 4 is one way in which the controller 321 and/or the vehicle 100 may be configured. Furthermore, the following discussion of the method 400 of FIG. 4 will lead to a further understanding of the vehicle 100, and its various components.

The method 400 of FIG. 4 need not be performed in the exact sequence as shown and likewise various blocks may be performed in parallel rather than in sequence. Accordingly, the elements of method 400 are referred to herein as "blocks" rather than "steps." The method 400 of FIG. 4 may be implemented on variations of the vehicle 100 of FIG. 1, as well.

Furthermore, the controller 321 is described hereafter as controlling the switches 307, 309, 311, 313, 315 (and/or a subset thereof) which is understood to occur via respective interfaces 347, 349, 351, 353, 355. Similarly, the controller 321 is described hereafter as receiving information from the batteries 303, 305 which is understood to occur via respective interfaces 333, 335.

It is furthermore assumed hereafter that, initially, the switch 309, 311, 313, 315 are open, and the switches 307 are closed, as depicted in FIG. 4.

At a block 402, the controller 321, based on the respective states of charges of the main batteries 303, control the switches 307, 309, 311, 313, 315 (and/or a subset thereof) to: disconnect one or more of the main batteries 303 from the motor controller 301 while a given number of the main batteries 303 continue to provide the power to the motor 111 via the motor controller 301.

For example, a respective states of charge of a main battery 303 may be less than a threshold value and/or less than a respective state of charge of others of the main batteries 303. In particular, it may be desirable that the states of charge of the main batteries 303 not fall below a given threshold state of charge, such as 50%, 60%, and/or any other suitable threshold value. Similarly, it may be desirable that states of charge of the main batteries 303 be maintained within a threshold range of each other, such as 5%, 10%, 15%, and/or any other suitable threshold range. Hence, when a given main battery 303 falls below a threshold state of charge and/or falls below a threshold range of states of charge of the other main batteries 303, the given main battery 303 may be disconnected from the motor controller 301 and connected to the intermediate batteries 305 for charging. Hence, it is further understood herein that one or more of the intermediate batteries 305 store power to charge the main batteries 303.

At a block 404, the controller 321, based on the respective states of charges of the main batteries 303, connects the one or more of the main batteries 303 (e.g. disconnected from the motor controller 301 at the block 402) to the intermediate batteries 305 (e.g. to charge the one or more of the main batteries 303) until the respective states of charges of the main batteries 303 are within a given range.

The given range may be based on the states of charge of the other main batteries 303 that are not being charged. For example, the given range of the block 404 may comprise 5%, 10%, 15%, and/or any other suitable given range of the average states of charge of the other main batteries 303 that are not being charged. Furthermore, as the one or more of the main batteries 303 connected to the intermediate batteries 305 are being charged, the states of charge of the other main batteries 303 that are not being charged may fall, lowering the given range throughout the charging process. Hence, the given range may be dynamic, with a goal of maintaining, when possible, all the main batteries 303 with a given range so they maintain similar states of charge, during operation of the vehicle 100.

At the block 402, to disconnect one or more of the main batteries 303 from the motor controller 301 while a given number of the main batteries 303 continue to provide the power to the motor 111 via the motor controller 301, the controller 321 may open respective switches 307 of the one or more of the main batteries 303 that are being disconnected from the motor controller 301, while leaving closed the respective switches 307 of the given number of the main batteries 303 that continue to provide the power to the motor 111 via the motor controller 301.

Similarly, at the block 404, to connect the one or more of the main batteries 303 (e.g. disconnected from the motor controller 301 at the block 402) to the intermediate batteries 305, the controller 321 closes the respective switches 309 of the one or more of the main batteries 303, and further closes the switch 315 and one or more of the switches 311. Similarly, to reconnect the one or more of the main batteries 303 to the motor controller 301, the controller 321 opens the respective switches 309 of the one or more of the main batteries 303 that were closed at the block 404 and closes the respective switches 307 of the one or more of the main batteries 303 that were opened at the block 402. In reconnecting, the switches 311, 315 may be open or closed, however the switch 313 remained open throughout the method 400.

Certain implementation details of the method 400 are next described, and it is understood that controlling the switches 307, 309, 311, 313, 315 to connect/disconnect batteries 303, 305 occurs as described above.

In a particular example, the controller 321 may implement a requirement that a given number of the main batteries 303 are to be used at any given time. For example, when there are ten main batteries 303, such a given number may be that six the main batteries 303 are to be used at any given time. Hence, when three of the main batteries 303 are at a relatively higher state-of-charge and seven of the main batteries 303 are at a relatively lower state-of-charge, the controller 321 may determine which three of the seven of the main batteries 303, having the lower state-of-charge, have a closest state of charge to the three of the main batteries 303, having the higher state-of-charge, and leave these main batteries 303 connected to the motor controller 301, while charging the rest of the main batteries 303 of having the lower state-of-charge. Put another way, when a given number of the main batteries 303 are to remain connected to the motor controller 301, the controller 321 charges the main batteries 303 having lower states of charge first to maintain the given number.

In some examples, in response to determining that a given main battery 303, of the main batteries 303, has a respective state of charge below a threshold state of charge (e.g. as stored in the application 323-1 and/or as determined by the controller 321) the controller 321 may control the switches 307, 309, 311, 313, 315 to: disconnect the given main battery 303 from the motor controller 301; connect the given main battery 303 to the intermediate batteries 305 until the state of charge of the given main battery 303 is within the given range; and thereafter, reconnect the given main battery 303 to the motor controller 301. In some examples, the threshold state of charge at which the given main battery 303 is charged is different from the given range at which the is reconnected to the motor controller 301 as the given range may be based on the states of charge of the other main batteries 303 which may decrease the given battery 303 is charged, as described above.

Put another way, in some examples, the given range may be based on respective current states of charges of the given number of the main batteries 303 that continue to provide the power to the motor 111 via the motor controller 301 while the one or more main batteries are being charged.

In some examples, the controller 321, in response to determining that the motor 111 is not generating a regeneration current, controls the switches 307, 309, 311, 313, 315 to connect the main batteries 303 to the motor controller 301 and disconnect the intermediate batteries 305 from the motor controller 301. Put another way, when no regeneration power and/or current is being generated by the motor 111, no charging of the intermediate batteries 305 via such regeneration power and/or current, received via the motor controller 301, may occur, so the intermediate batteries 305 are isolated from the motor controller 301.

However, in some examples, the controller 321, in response to determining that the motor 111 is generating a regeneration current, and that the regeneration current being generated is below a threshold current, may control the switches 307, 309, 311, 313, 315 to connect one or more of the main batteries 303 and the intermediate batteries 305 to the motor controller 301 to charge one or more of the main batteries 303 and the intermediate batteries 305. Put another way, when regeneration power and/or current is being generated by the motor 111, the intermediate batteries 305 (and/or the main batteries 303) may be charged via such regeneration power and/or current, received via the motor controller 301, so the intermediate batteries 305 may be connected to the motor controller 301 to charge them. Such charging may occur in tandem with charging of the main batteries 303.

However, such charging may depend on a size of the regeneration current. For example, certain currents, when received at a battery 303, 305, may damage a battery 303, 305. Hence, a battery 303, 305 may report such a respective threshold current to the controller 321 (e.g. as stored at a memory of a battery 303, 305) and/or such a threshold current may be preconfigured at the application 323-1. The motor controller 321 may report a size of a regeneration current to the controller 321, and the controller 321 may control the switches 307, 309, 311, 313, 315 accordingly, to prevent regeneration currents, that are above a threshold current, from damaging the batteries 303, 305.

However, in some of these examples, regeneration current may be used to charge intermediate batteries 305 but not any main batteries 303; for example, the intermediate batteries 305 may be generally configured to accept larger currents and/or more power for charging than the main batteries 303 and, as such, in some examples, to protect the main batteries 303 from surges in regeneration current, the controller 321 may control the switches 307, 309, 311, 313, 315 accordingly, to prevent regeneration currents, from charging the main batteries 305 (e.g. regardless of a size of the regeneration current).

Similarly, some batteries 303, 305 may be prevented from being charged when their respective states of charge and/or respective current capacities, are at respective values for example 100%, 95%, and/or any other state of charge and/or capacity. Put another way, when batteries 303, 305 are already fully charged, or close to fully charge, exposing them to regeneration current may damage them. Hence the controller 321 may control the switches 307, 309, 311, 313, 315 accordingly, to prevent certain batteries 303, 305, at high states, from being further charged, to prevent damaging the batteries 303, 305

Put another way, in some examples, the controller 321, in response to determining that the motor 111 is generating a regeneration current, may control the switches 307, 309, 311, 313, 315 to charge one or more of the main batteries 303 and the intermediate batteries 305 based on respective current capacities of the main batteries 303 and the intermediate batteries 305.

In some examples, the controller 321, based on the respective states of charge of the main batteries 303 meeting one or more given conditions: communicate with the motor controller 301 to reduce the power used by the motor 111. For example, in some examples one or more of the main batteries 303 may fail and, despite attempts to charge such main batteries 303, as described above, such states of charge of such main batteries 303 may not reach the given range of the block 404. In these examples, the controller 321 may control the switches 307, 309, 311, 313, 315 to isolate such main batteries 303, for example when they do not reach the given range of the block 404 within a given time period and/or when they do not charge at a given rate and/or according to a given model 325 and the like. With regards to the given model 325, it is understood that certain battery types, such as lithium batteries, may charge (and/or discharge) according to well understood conditions and/or models which may be provided, as the given model 325, to the controller 321 by a main battery 303 and/or may be preconfigured at the application 323-1.

Hence, a given condition for reducing power usage by the motor 111 may comprise a given number of the main batteries 303 failing such that, when the given number of the main batteries 303 fail, the controller 321 may transmit a command to the motor controller 301 to reduce power usage by the motor 111 to preserve stored power of the remaining batteries. Similarly, another given condition for reducing power usage by the motor 111 may comprise a given number of the main batteries 303 charging in manner that differs from a respective given model 325. However, the main batteries 303 meeting any suitable given condition may be used to reduce power usage by the motor 111; for example, another given condition for determining when a main battery 303 is failing may comprise determining, based monitored states of charge whether a main battery 303 is discharging (e.g. powering the motor 111) in manner that differs from a respective given model 325.

Similarly, the controller 321 may determine when a given intermediate battery 305 is failing based on whether, or not, an intermediate battery 305 is charging, or discharging, based on a respective given model 325. An intermediate battery 305 may be disconnected and/or prevented from charging by opening a respective switch 311.

Hence, in general, the controller 321 and/or the vehicle 100 may be generally configured to determine: when batteries 303, 305 are failing, or not, using given models 325; when the main batteries 303 are to be charged; when the batteries 303, 305 are to be taken out of service; amongst other possibilities.

In some of these examples, the controller 321, based on the respective states of charge of the main batteries 303 meeting one or more given conditions, may control a notification device 328 and/or another notification device, such as a cell phone of a user of the vehicle 100, to provide a notification of the one or more given conditions that is met. For example, such a notification may indicate which of the main batteries 303 have failed and hence should be replaced. The notification device 328 may comprise one or more microphones, display screens, haptic devices, and the like.

Figure 5:
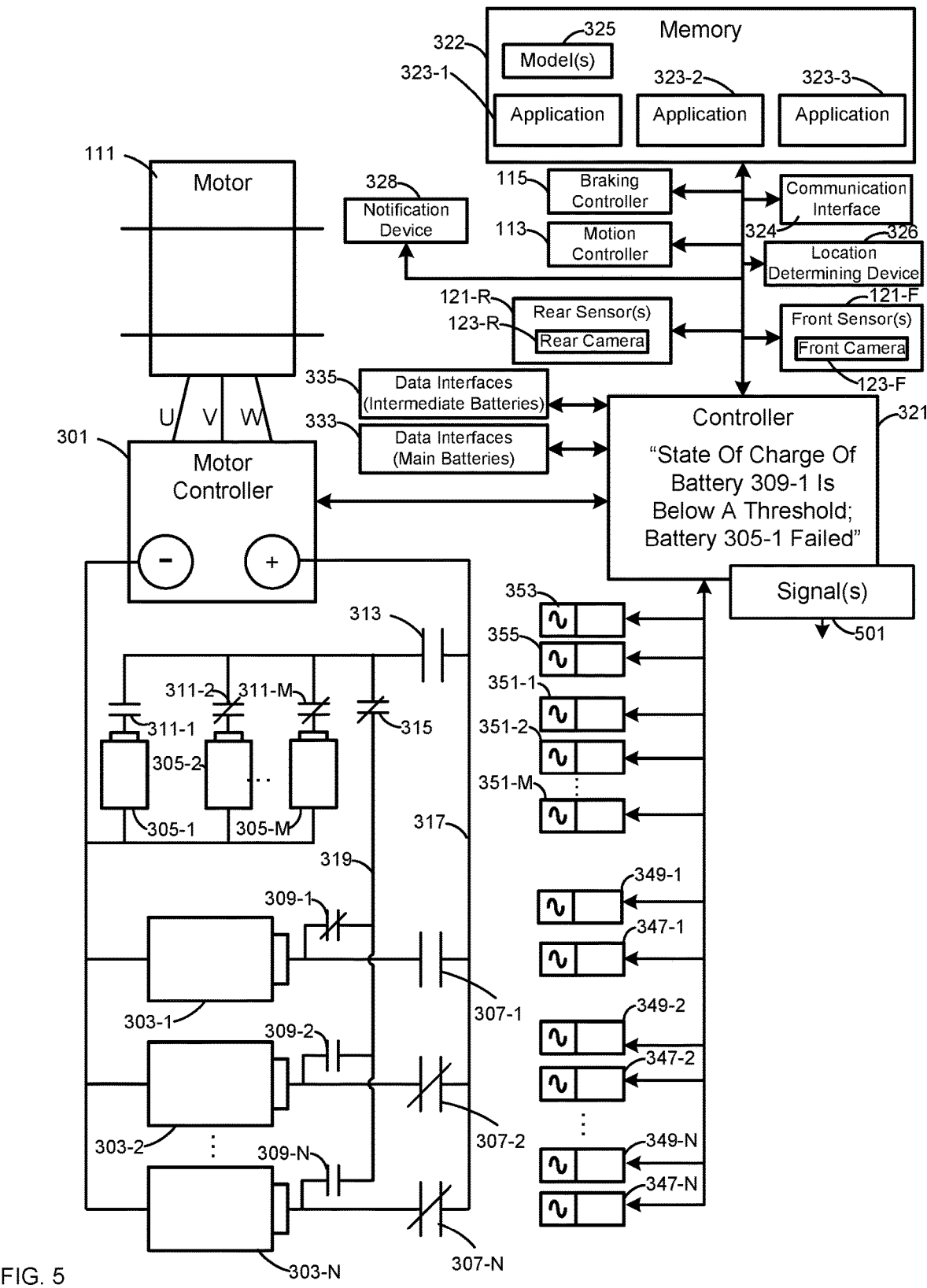
FIG. 5 depicts the electronic components in FIG. 3 implementing individual main battery charging from intermediate batteries while the vehicle of FIG. 1 is in operation, according to non-limiting examples.
Figure 6:
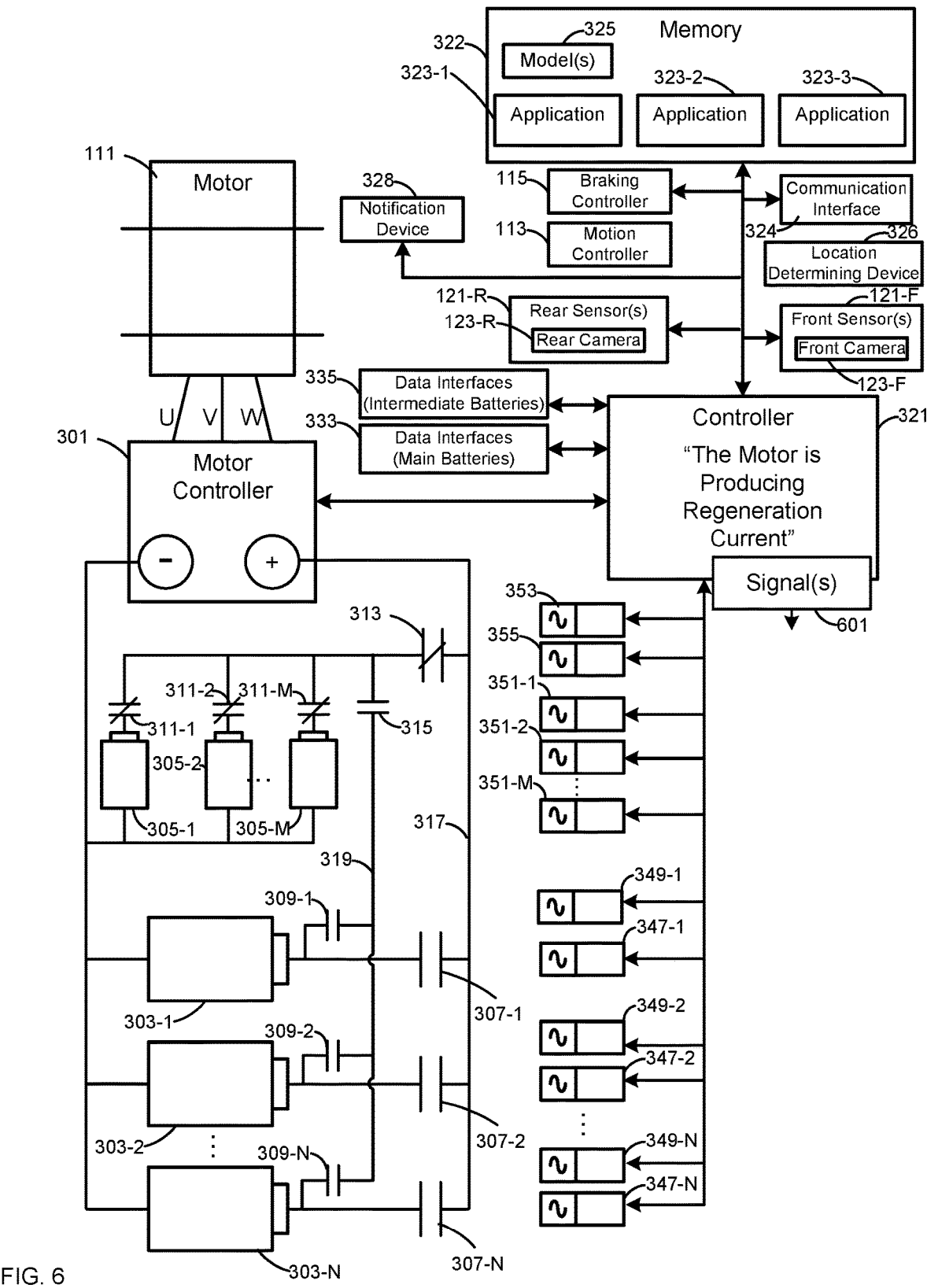
FIG. 6 depicts the electronic components in FIG. 3 implementing regeneration current charging while the vehicle of FIG. 1 is in operation, according to non-limiting examples.

Attention is next directed to FIG. 5 and FIG. 6 which respectively depict an example of charging a main battery 303 during operation of the vehicle 100 and charging the intermediate batteries 305. FIG. 5 and FIG. 6 are similar to FIG. 3 with like components having like numbers.

In FIG. 5, the controller 321 is depicted determining that a state of charge of the main battery 303-1 has fallen below a threshold, and further determining that the intermediate battery 305-1 has failed. As such, the controller 321 has controlled the switches 309-1, 311-2, 311-3, 315 to close and has controlled the switch 307-1 to open. As such, the main battery 303-1 is electrically connected to the intermediate batteries 305-2, 305-3 which charge the main battery 303-1 until the state of charge of the main battery 303-1 is within a given range, as described above, at which point the controller 321 controls the switches 307, 309, 311, 313, 315 to return to the same state as depicted in FIG. 3. However, in FIG. 5, the main battery 303-1 is isolated from the primary power line 317 (e.g. as the switch 307-1 is open), as are the intermediate batteries 305 (e.g. as the switch 313 is open). Furthermore, as the intermediate battery 305-1 has failed, the switch 311-1 is open. Such changes to states of the switches 307, 309, 311, 313, 315 may be via suitable signals 501 and/or voltages to the interfaces 347, 349, 351, 353, 355 of the switches 307, 309, 311, 313, 315.

In FIG. 6, the controller 321 has determined that the motor 111 is generating regeneration current (e.g. based on information received from the motor controller 301) and, compared to FIG. 4, opens the switches 307, 315 to isolate the main batteries 303 from the motor controller 301 (e.g. and the intermediate batteries 305), and closes the switches 311, 313 to charge the intermediate batteries 305. While the switch 311-1 is depicted as closed to attempt to charge the intermediate battery 305-1, when the intermediate battery 305-1 is determined to be failing, the controller 321 may open the switch 311-1 to isolate the intermediate battery 305-1. Such changes to states of the switches 307, 309, 311, 313, 315 may be via suitable signals 601 and/or voltages to the interfaces 347, 349, 351, 353, 355 of the switches 307, 309, 311, 313, 315.

In particular the state of the switches 307, 309, 311, 313, 315 in FIG. 6 may be referred to as a regeneration state as the switches 307, 309, 311, 313, 315 are controlled to connect one or more of the intermediate batteries 305 to the motor controller 301 to charge the one or more of the intermediate batteries 305 using regeneration current. In some examples, a regeneration state of the switches 307, 309, 311, 313, 315 may include the switches 307, 309, 311, 313, 315 being in a state where one or more of the main batteries 303 are charged using regeneration current; the switches 307 may be opened, one or more of the switches 309 may be closed, and the switches 313, 315 may be closed. However, any state where one or more of the batteries 303, 305 are charged using regeneration current is understood to be a regeneration state. Furthermore a regeneration state may change with time. For example, the intermediate batteries 305 may initially be charged, however, as they respectively reach a threshold charge capacity, respective switches 311 may be opened, the switch 315 may be closed, and respective switches 309 may be closed to charge one or more of the main batteries 303 (e.g. until they reach a threshold charge capacity).

Other conditions may be used to place the switches 307, 309, 311, 313, 315 into a regeneration state.

Figure 7:
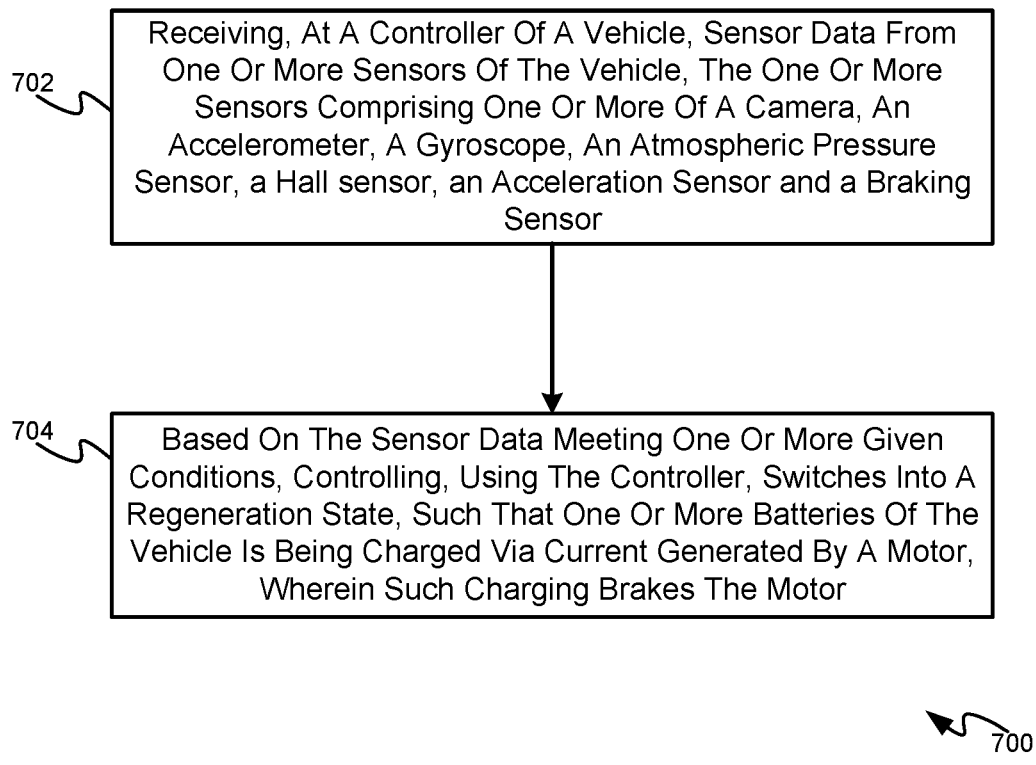
FIG. 7 depict a flowchart of a method for sensor-based battery charging in the vehicle of FIG. 1, according to non-limiting examples.

For example, attention is now directed to FIG. 7 which depicts a flowchart representative of a method 700 for sensor-based battery charging. The operations of the method 700 of FIG. 7 correspond to machine readable instructions that are executed by the controller 321. In the illustrated example, the instructions represented by the blocks of FIG. 7 are stored at the memory 322 for example, as the application 323-2. The method 700 of FIG. 7 is one way in which the controller 321 and/or the vehicle 100 may be configured. Furthermore, the following discussion of the method 700 of FIG. 7 will lead to a further understanding of the vehicle 100, and its various components.

The method 700 of FIG. 7 need not be performed in the exact sequence as shown and likewise various blocks may be performed in parallel rather than in sequence. Accordingly, the elements of method 700 are referred to herein as "blocks" rather than "steps." The method 700 of FIG. 7 may be implemented on variations of the vehicle 100 of FIG. 1, as well.

At a block 702, the controller 321 receives sensor data from the one or more sensors 121.

At a block 704, the controller 321, based on the sensor data meeting one or more given conditions, controls the switches 307, 309, 311, 313, 315 (and/or a subset thereof) into a regeneration state, such that one or more of the batteries 303, 305 is being charged via current (e.g. regeneration current) generated by the motor 111; furthermore, it is understood that such charging brakes the motor 111 as the motor 111 must "work" to generate the current to charge the batteries 303, 305.

A given condition given, of the given conditions, may comprises detection of one or more of coasting and deceleration in the sensor data. For example, sensor data from one or more of an accelerometer, a gyroscope, an atmospheric pressure sensor, a Hall sensor, an acceleration sensor and a braking sensor may indicate that the vehicle 100 is coasting and/or decelerating (e.g. slowing down), which may indicate that the vehicle 100 is to come to reduce speed and/or come to stop (e.g. before the brakes 117 are applied) and hence the controller 321 may control the switch 307, 309, 311, 313, 315 (and/or a subset thereof) into a regeneration state to reduce velocity of the vehicle 100 and charge one or more of the batteries 303, 305.

Similarly, the controller 321 may be further configured to: based on the sensor data meeting the one or more given conditions and detecting braking (e.g. via the braking controller 115 being actuated and/or any other suitable device of the vehicle 100 that may be used to detect when braking is occurring), control the switches 307, 309, 311, 313, 315 into the regeneration state. Indeed, while the braking controller 115 has been described as an actuator for controlling the brakes 117, the braking controller 115 may comprise any suitable device that may be used to detect when braking is occurring at the vehicle 100.

Similarly, the controller 321 may be further configured to: based on the sensor data meeting the one or more given conditions and detecting that the motion controller 113 has stopped being actuated, (which may also indicate that the vehicle 100 is to coast and/or decelerate), control the switches 307, 309, 311, 313, 315 into the regeneration state.

However, the controller 321 may control the switches 307, 309, 311, 313, 315 out of the regeneration state when the motion controller 113 is actuated to provide power to the motor 111, and/or based on any other suitable determination, for example, when the regeneration current stops and/or the vehicle 100 stops.

In particular examples where the one or more sensors 121 comprises a camera 123 that has a field of view in a direction of motion of the vehicle 100, a given condition, of the given conditions, may comprises images from the camera 123 including one or more of a stop sign and a red light located in a direction of motion of the vehicle 100. For example, a stop sign and/or a red light in images from the front-facing camera 123-F may indicate that the vehicle 100 has to brake and hence the switches 307, 309, 311, 313, 315 may be controlled into a regeneration state to assist with braking the vehicle 100 and charge one or more of the batteries 303, 305. Again, the controller 321 may control the switches 307, 309, 311, 313, 315 out of the regeneration state when the motion controller 113 is actuated to provide power to the motor 111, and/or based on any other suitable determination, for example, when the regeneration current stops and/or the vehicle 100 stops and/or a red light turns green as determined from images from a camera 123, and the like.

In other particular examples where the one or more sensors 121 comprises a camera 123 that has a field of view in a direction of motion of the vehicle 100, a given condition, of the given conditions, may comprises images from the camera 123 including a decline (e.g. downward hill) located in a direction of motion of the vehicle 100. For example, such a decline may indicate that the vehicle 100 may shortly be coasting down a hill and from the front-facing camera 123-F may indicate that the vehicle 100 has to brake and hence the switches 307, 309, 311, 313, 315 may be controlled into a regeneration state to assist with braking the vehicle 100 and charge one or more of the batteries 303, 305. Again, the controller 321 may control the switches 307, 309, 311, 313, 315 out of the regeneration state when the motion controller 113 is actuated to provide power to the motor 111, and/or based on any other suitable determination, for example, when the regeneration current stops and/or the vehicle 100 stops and/or the decline ends, as determined from images from a camera 123, and the like, and/or the atmospheric pressure sensor.

As mentioned above, the vehicle 100 may include a location determining device, such as a GPS device, and the like. The controller 321 may hence determine, from the location determining device, locations at which the switches 307, 309, 311, 313, 315 are controlled into a regeneration state and store such locations in the memory 322, as well as locations at which the switches 307, 309, 311, 313, 315 are controlled out of the regeneration state. Similarly, controller 321 may hence determine a given distance and/or a given time period that the switches 307, 309, 311, 313, 315 were in a regeneration state.

The vehicle 100 may hence be trained as to locations at which the switches 307, 309, 311, 313, 315 are controlled to be controlled into, and/or out of, the regeneration state, and/or a given distance and/or given time period that the switches 307, 309, 311, 313, 315 are to be in a regeneration state (e.g. starting at a given location).

As such, a given condition, of the one or more given condition, may comprises a determination from the sensor data that the motor 111 will begin generating regeneration current at one or more of: at a given location; for a given distance; and for a given time period, and the switches 307, 309, 311, 313, 315 may be controlled into, and out of, a regeneration state accordingly. Put another way, the controller 321 may be further configured to control the switches 307, 309, 311, 313, 315 into a regeneration state one or more of: at a given location; for a given distance; and for a given time period.

Put another way, the memory 322 may store a history of locations of previous regeneration events (e.g. when the switches 307, 309, 311, 313, 315 were controlled into a regeneration state, and the vehicle 100 may comprise a location determining device 326 (e.g. a GPS device); in these example, the controller 321 is understood to communicatively coupled to the memory 322 and the location determining device 326, and the controller 321 may be further configured to: compare a current location, determined via the location determination device, with the locations of the previous regeneration events stored in the memory 322; and in response to the current location being within a threshold distance from a location of a respective previous regeneration event, control the switches 307, 309, 311, 313, 315 into a regeneration state. The threshold distance may be fixed (e.g. predetermined) and/or may depend on the current location and/or velocity of the vehicle 100. For example, locations of declines and/or hills may be associated with a threshold distance of 1 meter, 2 meters, and the like, while locations of stop signs may be associated with a threshold distance of 10 meters, and the like, for example to brake the vehicle 100 a further distance from a stop sign than a decline. However, any suitable thresholds are within the scope of the present specification and may further be determined from when the braking controller 115 and/or the motion controller 113 were actuated (and/or were stopped from being actuated) at a given location.

Furthermore, the threshold may be directional. For example, the vehicle 100 may be going up a hill, and the switches 307, 309, 311, 313, 315 may have previously been controlled into a regeneration state at the top of the hill when the vehicle 100 was travelling in an opposite direction (e.g. towards a decline of the hill). As such, when the vehicle 100 reaches the top of the hill, the switches 307, 309, 311, 313, 315 are not controlled into a regeneration state as the vehicle 100 is not headed down the hill.

Figure 8:
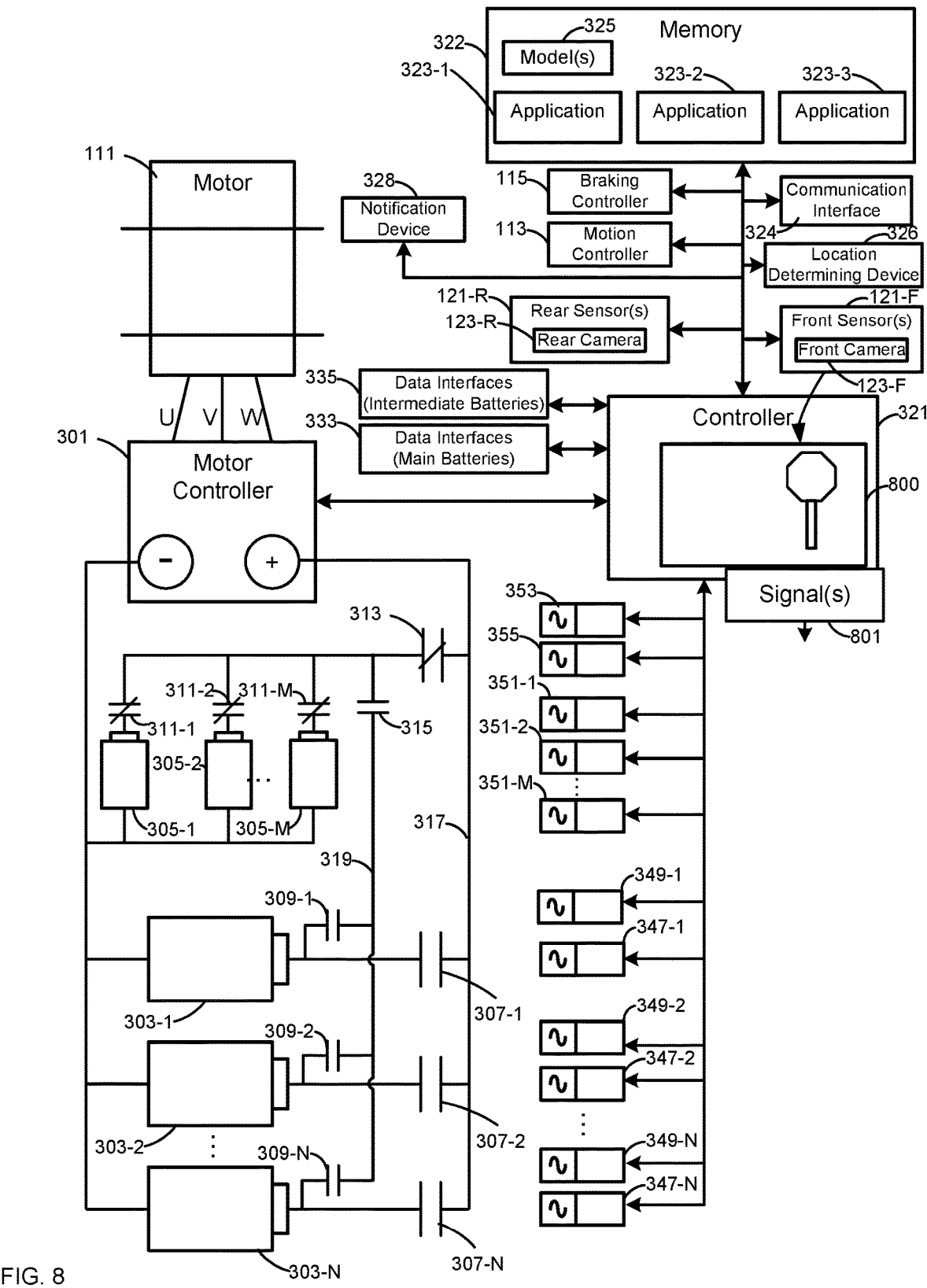
FIG. 8 depicts the electronic components in FIG. 3 implementing sensor-based battery charging, according to non-limiting examples.

Attention is next directed to FIG. 8 which depicts an example of sensor-based battery charging during operation of the vehicle 100. FIG. 8 is similar to FIG. 6 with like components having like numbers.

However, in FIG. 8, the controller 321 is receiving an image 800 from the front-facing camera 123-F that includes a stop sign. As such, the controller 321 controls the switches 307, 309, 311, 313, 315 into a regeneration state via appropriate signals 801. While not depicted, the controller 321 may store, at the memory 322, a location determined via the location determining device 326 at which the switches 307, 309, 311, 313, 315 were controlled into the regeneration state so that when the vehicle 100 is at that location, and/or within a threshold distance therefrom, the switches 307, 309, 311, 313, 315 may again be controlled into the regeneration state.

In some examples, as the vehicle 100 is equipped with a rear-facing camera 123-R, images from the rear-facing camera 123-R may be used to avoid and/or minimized collisions with other vehicles approaching the vehicle 100 from the rear.

Figure 9:
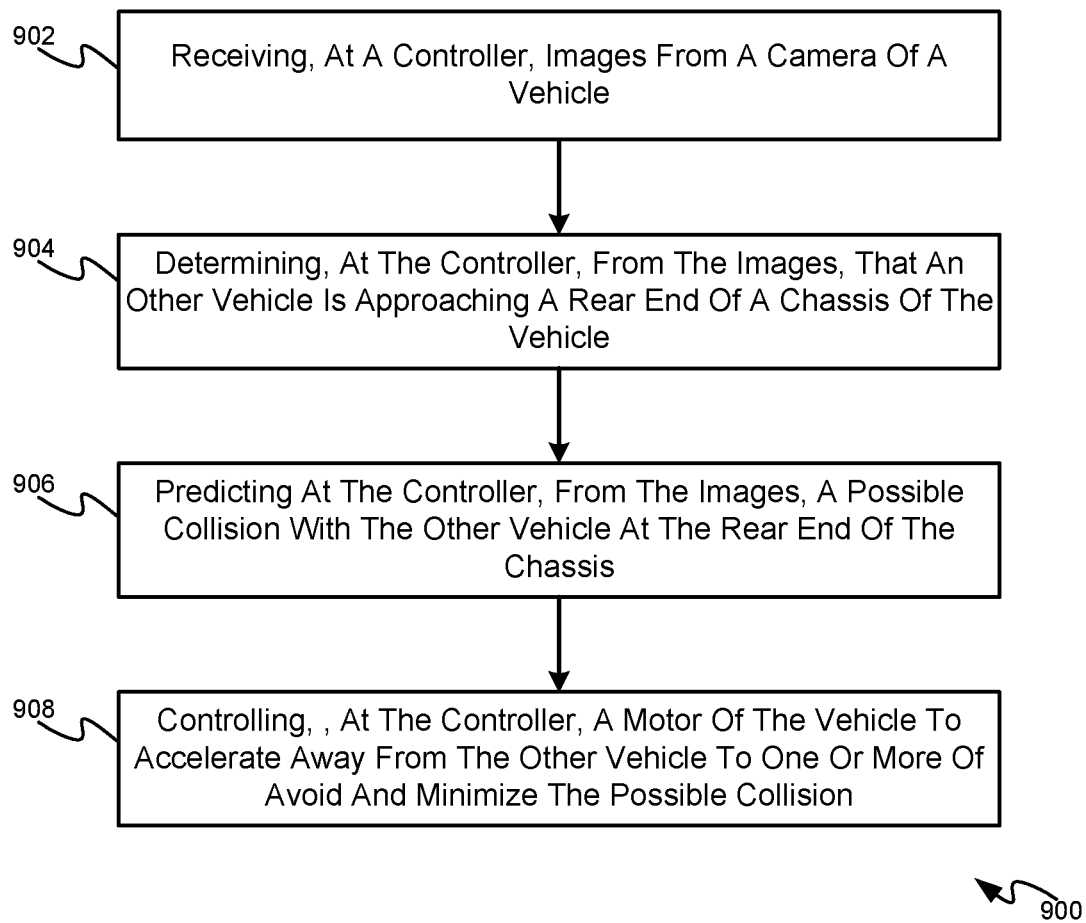
FIG. 9 depict a flowchart of a method for rear collision avoidance in the vehicle of FIG. 1, according to non-limiting examples.

For example, attention is now directed to FIG. 9 which depicts a flowchart representative of a method 900 for rear collision avoidance. The operations of the method 900 of FIG. 9 correspond to machine readable instructions that are executed by the controller 321. In the illustrated example, the instructions represented by the blocks of FIG. 9 are stored at the memory 322 for example, as the application 323-2. The method 900 of FIG. 9 is one way in which the controller 321 and/or the vehicle 100 may be configured. Furthermore, the following discussion of the method 900 of FIG. 9 will lead to a further understanding of the vehicle 100, and its various components.

The method 900 of FIG. 9 need not be performed in the exact sequence as shown and likewise various blocks may be performed in parallel rather than in sequence. Accordingly, the elements of method 900 are referred to herein as "blocks" rather than "steps." The method 900 of FIG. 9 may be implemented on variations of the vehicle 100 of FIG. 1, as well.

Furthermore, in the following discussion, the controller 321 may be described as controlling the motor 111, which is understood to occur via the controller 321 transmitting commands to the motor controller 301.

At a block 902, the controller 321 receive images from the rear-facing camera 123-R which is understood to have a field of view facing away from the rear end of the chassis 106 and/or the vehicle 100;

At a block 904, the controller 321 determines, from the images, that an other vehicle (e.g. a second vehicle) is approaching the rear end of the chassis 106 and/or the vehicle 100.

At a block 906, the controller 321 predicts, from the images, a possible collision with the other vehicle at the rear end of the chassis 106 and/or the vehicle 100.

At a block 908, the controller 321, in response, to predicting the possible collision, controls the motor 111 to accelerate the chassis 106 and/or the vehicle 100 away from the other vehicle to one or more of avoid and minimize the possible collision.

Hence, for example, at the block 904, the controller 321 may determine that the other vehicle is approaching the rear end of the chassis 106 via suitable machine learning classifiers and/or video analysis to identify the other vehicle, as well as a relative velocity of the other vehicle (e.g. relative to a respective velocity of the vehicle 100), a distance between the rear end of the chassis 106 and the other vehicle, and/or an estimated time of the possible collision, and an acceleration value of the motor 111 may be selected accordingly. For example, the motor 111 may be controlled to accelerate the vehicle 100 to about match a velocity of the other vehicle, and/or the motor 111 may be controlled to accelerate the vehicle 100 to be greater than a velocity of the other vehicle.

Furthermore, the motor 111 may be controlled to accelerate the vehicle 100 to avoid the possible predicted collision and/or to control relative velocities between the vehicle 100 and the other vehicle to as small a velocity as possible to minimize the impact therebetween.

However, images from the front-facing camera 123-F may be used to determine when there any objects in front of the vehicle 100 and the controller 321 may control the vehicle 100 to avoid such objects. Furthermore such collision avoidance may depend on types of the identified objects (e.g. determined via machine learning classifiers, and the like, applied to images from the front-facing camera 123-F). For example, certain types of vehicles (e.g. bicycles, cars, and the like), people, baby carriages, and the like may be avoided, but certain types of vehicles (e.g. drones, and the like) animals and/or certain types of animals may be avoided (e.g. dogs and cats may be avoided, but rats may not be avoided). Such avoidance may include stopping the vehicle 100 via the controller 321 controlling the braking controller 115, and the like, which may come at the expense of the other vehicle rear-ending the vehicle 100.

However, such avoidance may include swerving the vehicle 100 via the controller 321 controlling the wheels 104 of the vehicle 100 (which may be possible in some types of the vehicle 100, such as cars, drones, and the like), but not others (e.g. bicycles). Such examples further illustrate that the controller 321 may be configured to autonomously control the vehicle 100.

Hence, the controller 321 may be further configured to: in conjunction with predicting the possible collision, determine, from the images, an estimated time of the possible collision, and the control of the motor 111 to accelerate the chassis 106 away from the other vehicle to avoid a collision therewith may be further based on an estimated time to the collision.

Furthermore, the vehicle 100 may comprise the second front-facing camera 123-F with a respective field of view facing away from the front end of the chassis 106, and the controller 321 may be further configured to: receive respective images from the second camera 123-F; determine, from the respective images, one or more objects located in the respective field of view of the second camera 123-F; and control the motor 111 to accelerate the chassis 106 away from the other vehicle to one or more of avoid or minimize the possible collision, while avoiding the one or more objects.

In some examples, the controller 321 may be further configured to: receive respective images from the second camera 123-F; determine, from the respective images, respective types of one or more objects located in the respective field of view of the second camera 123-F; and control the motor 111 to accelerate the chassis 106 away from the other vehicle to one or more of avoid or minimize the possible collision, while avoiding given respective types of the one or more objects.

In some examples, the controller 321 may be further configured to: receive respective images from the second camera 123-F; determine, from the respective images, respective types of one or more objects located in the respective field of view of the second camera 123-F; and control the motor 111 to accelerate the chassis 106 away from the other vehicle to one or more of avoid or minimize the possible collision, while not avoiding given respective types of the one or more objects.

Figure 10:
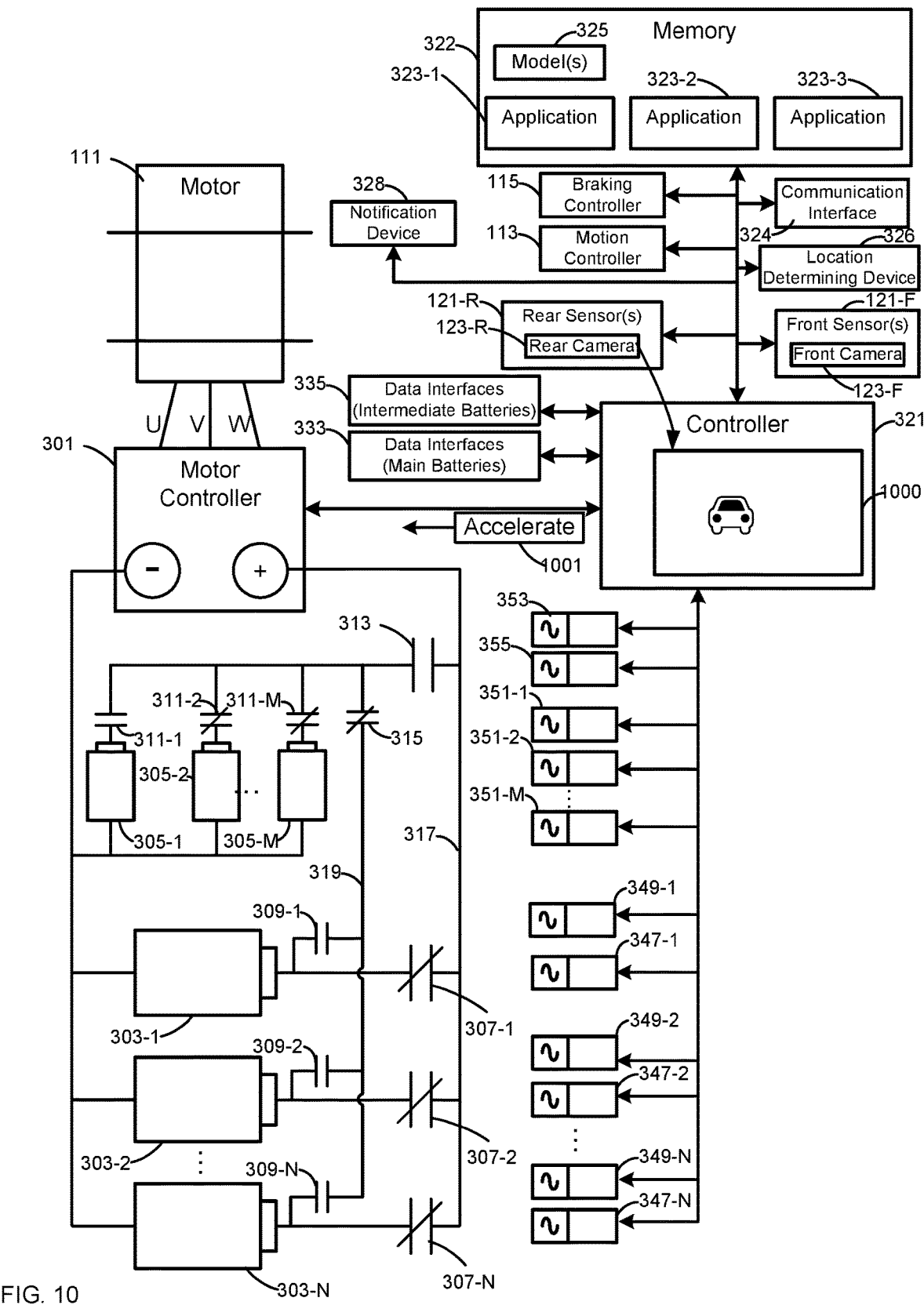
FIG. 10 depicts the electronic components in FIG. 3 implementing rear collision avoidance, according to non-limiting examples.

Attention is next directed to FIG. 10 which depicts an example of for rear collision avoidance during operation of the vehicle 100. FIG. 10 is similar to FIG. 3 with like components having like numbers, hence in FIG. 10, all of the main batteries 303 are being used to power the motor 111.

However, in FIG. 10, the controller 321 is receiving an image 1000 from the rear-facing camera 123-R that includes a car moving towards the rear end of the vehicle. As such, the controller 321 transmit a command 1001 to the motor controller 301 to cause the motor controller 301 to control the motor 111 to accelerate away from the car in the image 1000. The controller 321 is further understood to implement any suitable object avoidance mechanisms while doing so.

In some examples, the controller 321, and/or one or more of the applications 323 (e.g. such as the application 323-1) may be further adapted to track aging and/or relative changes of the main batteries 303, and control one or more of charging of the main batteries 303 and use of the main batteries 303 to power the motor 111 accordingly.

For example, with regards to aging, as previously described, the main batteries 303 may operate according to a given model 325, which may be stored at the memory 322 and/or may be preconfigured at an application 323. Furthermore, batteries aging and/or degrading may generally result in increased internal resistance, and internal impedance as well as reduced energy storage capacity of a battery (e.g. a main battery 303). Battery again is understood to occur many charge and discharge cycles of a battery (e.g. a main battery 303). One parameter used to determine and/or track battery energy is energy storage capacity, and, in some examples, a battery (e.g. a main battery 303) may be considered to reach end of life when the energy storage capacity is less than 70% of its original capacity.

Hence, a given model 325 may indicate how an open circuit voltage of a main battery 303 changes over time as a function of one or more of a state of charge of a main battery 303 and/or temperature. Alternatively, or in addition, the given model 325 may indicate how one or more of internal resistance and internal impedance of a main battery 303 changes over time as a function of one or more of a state of charge of a main battery 303 and/or temperature.

However, such given models 325 are understood to be ideal models which may represent how a battery ages in a factory setting, and may not reflect how a battery actually ages.

As such, the controller 321 may be further adapted to maintain a respective model 325 for each of the main batteries 303, and adjust such models 325 over time based on data received from the main batteries 303 via the data interface 333. For examples, the main batteries 303 may report, to the controller 321, respective open circuit voltages, respective internal resistance, and/or respective internal impedance along with respective states of charge and/or respective temperatures. As such, the controller 321 may track an open circuit voltage of a main battery 303 as a function over time of one or more of a state of charge of a main battery 303 and/or temperature; alternatively, or in addition, the controller 321 may track one or more of internal resistance and internal impedance of a main battery 303 as a function over time of one or more of a state of charge of a main battery 303 and/or temperature. The controller 321 may then adjust the models 325 for the main batteries 303 accordingly, and use the adjusted models 325 to control one or more of charging of the main batteries 303 and use of the main batteries 303 to power the motor 111 accordingly.

In particular, the controller 321 may adjust the models 325 based on data received from the main batteries 303. Such adjusting may occur via one or more machine learning models 325 trained to adjust such models 325. Furthermore, the controller 321 may use the adjusted models 325 to control one or more of charging of the main batteries 303 and use of the main batteries 303 to power the motor 111 such that the main batteries 303 age at a same relative rate, and/or such that the main batteries 303 reach a given aging threshold condition at around a same time. Such a given aging threshold condition may comprise a maximum stage of charge of a main battery 303 comprising a of a 10% state of charge relative to an initial maximum state of charge of the main battery 303 (e.g. when the main battery 303 was new and/or installed at the vehicle 100). However, such a 10% state of charge is understood to be one example of a given aging threshold condition and other examples are within the scope of the present specification including, but not limited to, other percentage states of charge (e.g. 5%, 15%, 20%, 30% . . . ), and/or given maximum power and/or current outputs (e.g. relative to initial maximum power and/or current output), and the like.

Hence, for example, based on the updated models 325, the controller 321 may control the switches 307, 309, 311, 313, 315 such that main batteries 303 that are aging faster than other main batteries 303 are charged at a slower relative rate. For example, main batteries 303, that are aging faster than other main batteries 303, may have higher internal resistance and/or internal impedance than other main batteries 303 that are aging slower, and hence the charging of such faster aging main batteries 303 is slower relative to the other main batteries 303 to prevent the faster aging main batteries 303 from heating (e.g. due to the higher internal resistance and/or internal impedance).

Similarly, based on the updated models 325, the controller 321 may control the switches 307, 309, 311, 313, 315 such that more energy from main batteries 303 that are aging slower than other main batteries 303 is used to power the motor 111.

Put another way, the controller 312 may be generally configured to: track aging of the main batteries 303; during discharge of the main batteries 303 (e.g. when powering the motor 111), when high output currents are used, prioritize given main batteries 303 that are in a healthier state than other main batteries 303 for high output current draws; and, when charging the main batteries 303, use lower charging current on main batteries 303 that are less healthy as indicated by their respective aging as indicated by respective updated and/or adjusted models 325. In these examples, the term "healthy battery" is understood to mean a battery that is aging slower than other batteries and/or a battery that is aging slower than indicated by an initial respective model 325. Similar, the term "unhealthy battery" and/or "less healthy" battery is understood to mean a battery that is aging faster than other batteries and/or a battery that is aging faster than indicated by an initial respective model 325. Furthermore, the controller 312 may further reduce aging of the main batteries 303 by controlling the switches 307, 309, 311, 313, 315 such that regeneration current is directed to the intermediate batteries 305 rather than the main batteries 303, as regeneration currents may be relatively high and/or high enough to damage the main batteries 303, especially when a main battery 303 is in a "high" state of charge (e.g. above a threshold state of charge).

Allowing regen currents to go primarily to sacrificial pack, as high charging currents damage the batteries the most, especially at high SOC Furthermore, such charging and/or energy use may also be implemented via one or more machine learning models 325 trained to charge the main batteries 303 based on updated respective models 325, and/or trained to use energy from the main batteries 303 based on updated respective models 325.

Furthermore, with respect to relative changes of the main batteries 303, which may be referred to as battery imbalance, such battery imbalance is a process where a state of charge of different batteries (e.g. the main batteries 303) operating together drift apart. Battery imbalance may occur faster (and/or much faster) than battery aging. Battery imbalance is much faster than battery aging and may and occur within a charging/discharging cycle, and may occur due to differences in the main batteries 303 such as different battery discharge rates, different internal resistances and/or impedances, among other possibilities, and which may be due to manufacturing non-uniformities between the main batteries 303, and the like.

To address battery imbalance, the controller 312 may be further configured to: the switches 307, 309, 311, 313, 315 to charge and/or discharge the main batteries 303 differently, such that: each of the main batteries 303 are at a same and/or similar state of charge at the end of each so they meet the same SOC at the end of each charging/discharging cycle (e.g. about 10% of a state of charge of a respective battery 303 after charging); and one or more of: using relatively higher state-of-charge main batteries 303 to charge relatively lower state-of-charge main batteries 303; and using energy from the intermediate batteries 305 to charge the relatively lower state-of-charge main batteries 303.

Figure 11:
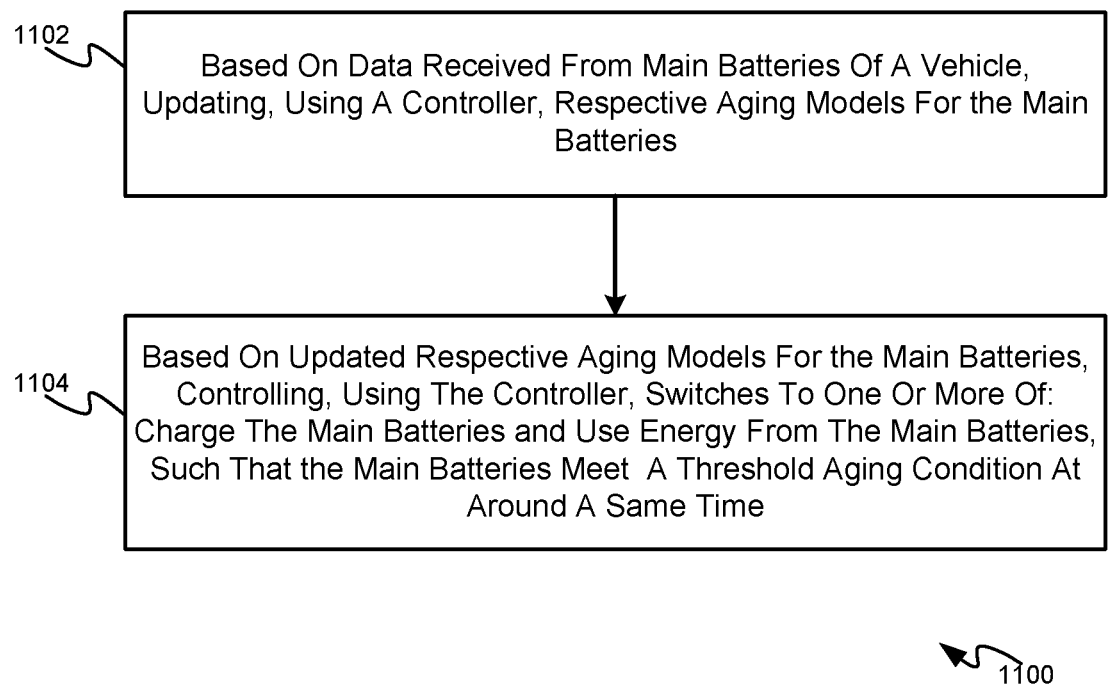
FIG. 11 depict a flowchart of another method for battery management in the vehicle of FIG. 1, according to non-limiting examples.

Attention is now directed to FIG. 11 which depicts a flowchart representative of a method 1100 for battery management. The operations of the method 1100 of FIG. 11 correspond to machine readable instructions that are executed by the controller 321. In the illustrated example, the instructions represented by the blocks of FIG. 11 are stored at the memory 322 for example, as an application 323 (e.g. the application 323-1 adapted accordingly). The method 1100 of FIG. 11 is one way in which the controller 321 and/or the vehicle 100 may be configured. Furthermore, the following discussion of the method 1100 of FIG. 11 will lead to a further understanding of the vehicle 100, and its various components.

The method 1100 of FIG. 11 need not be performed in the exact sequence as shown and likewise various blocks may be performed in parallel rather than in sequence. Accordingly, the elements of method 1100 are referred to herein as "blocks" rather than "steps." The method 1100 of FIG. 11 may be implemented on variations of the vehicle 100 of FIG. 1, as well.

At a block 1102, the controller 321, based on data received from main batteries 303 of a vehicle 100, updates respective aging models 325 for the main batteries 303.

The data from the main batteries 303 may include, but is not limited to, one or more of: state of charge, open circuit voltage, internal resistance, internal impedance, and temperature.

Furthermore, the adjustment of the block 1102 has been described above, and may include, but is not limited to, adjusting one or more functions of open circuit voltage and/or internal resistance and/or internal impedance with respect to one or more of state of charge and temperature, over time. For example, internal resistance and/or internal impedance of a main battery 303 may increase over time as influenced by one or more of state of charge and temperature.

At a block 1104, the controller 321, based on updated respective aging models 325 for the main batteries 303, controls switches 307, 309, 311, 313, 315 to one or more of: charge the main batteries 303 and use energy from the main batteries 303 such that the main batteries 303 meet a threshold aging condition at around a same time. Indeed, Put another way, at the block 1104, the controller 321, based on updated respective aging models 325 for the main batteries 303, controls switches 307, 309, 311, 313, 315 to control aging of the main batteries 303 such that the main batteries 303 meet a threshold aging condition at around a same time. Examples of threshold aging conditions have been described above.

Furthermore, the method 1100 may be implemented via one or more machine learning algorithms.

In some examples, the method 1100 may further comprise the controller 321 determining that one or more of the main batteries 303 is aging at a rate that is faster than a threshold rate, and control the notification device 328, and/or another notification device, such as a mobile phone of a user of the vehicle 100, to indicate that such one or more of the main batteries 303 should be changed and/or when such one or more of the main batteries 303 should be changed. For example, the controller 321 may determine that a main battery 303 is aging at a rate that is faster than a threshold rate and predict when such a main battery 303 may fail based on a respective updated model 325, and control the notification device 328, and/or another notification device to indicate that such a main battery 303 should be changed prior to when such a main battery 303 is predicted to fail.

Indeed, such a prediction of failure may be based on a rate of change of maximum power output (e.g. which may be referred to as power fade) and/or a rate of change of charge capacity (e.g. which may be referred to as capacity fade). Furthermore, such a failure may not be based on a threshold rate, but rather on maximum power output and/or charge capacity relative to one or more other main batteries 303.

Figure 12:
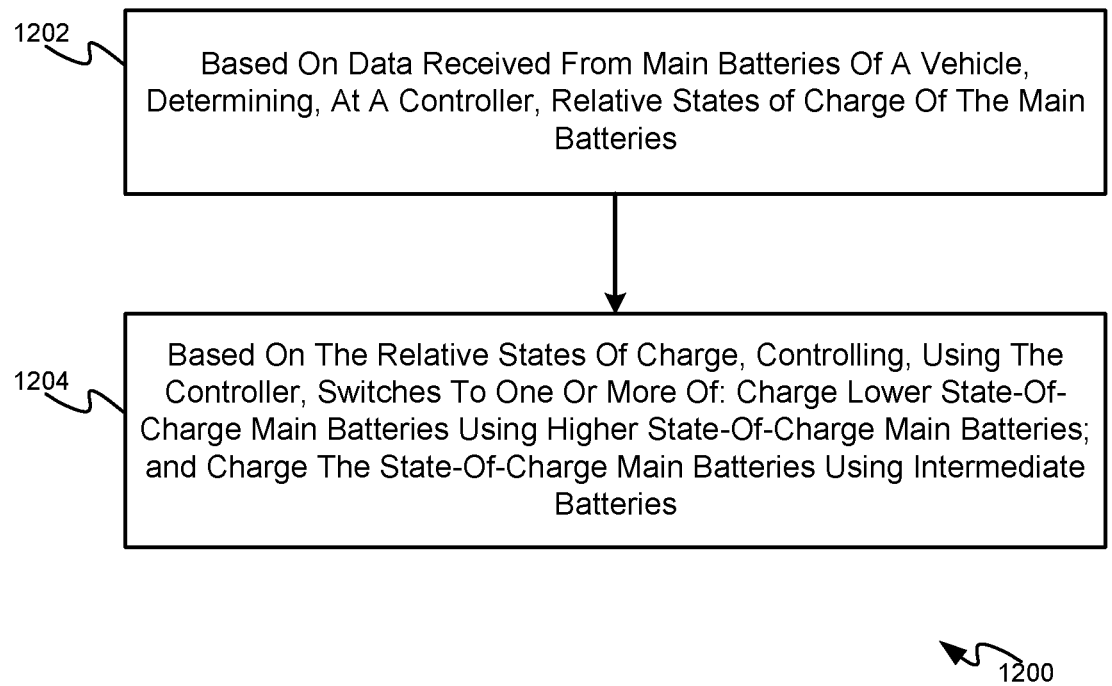
FIG. 12 depict a flowchart of yet another method for battery management in the vehicle of FIG. 1, according to non-limiting examples.

Attention is now directed to FIG. 12 which depicts a flowchart representative of another method 1200 for battery management. The operations of the method 1200 of FIG. 12 correspond to machine readable instructions that are executed by the controller 321. In the illustrated example, the instructions represented by the blocks of FIG. 12 are stored at the memory 322 for example, as an application 323 (e.g. the application 323-1 adapted accordingly). The method 1200 of FIG. 12 is one way in which the controller 321 and/or the vehicle 100 may be configured. Furthermore, the following discussion of the method 1200 of FIG. 12 will lead to a further understanding of the vehicle 100, and its various components.

The method 1200 of FIG. 12 need not be performed in the exact sequence as shown and likewise various blocks may be performed in parallel rather than in sequence. Accordingly, the elements of method 1200 are referred to herein as "blocks" rather than "steps." The method 1200 of FIG. 12 may be implemented on variations of the vehicle 100 of FIG. 1, as well.

At a block 1202, the controller 321, based on data received from the main batteries 303 of the vehicle 100, determines, relative states of charge of the main batteries 303.

At a block 1204, the controller 321, based on the relative states of charge, controls the switches 307, 309, 311, 313, 315 to one or more of: charge lower state-of-charge main batteries 303 using higher state-of-charge main batteries 303; and charge the lower state-of-charge main batteries 303 using intermediate batteries 305.

In some examples, higher and lower state-of-charge main batteries 303 may be determined relative to respective states of charges of the main batteries 303. In other examples higher and lower state-of-charge main batteries 303 may be determined relative to a threshold state of charge. For example, a main battery 303 may be determined to be a low state of charge battery when below a 50% state of charge, and a main battery 303 may be determined to be a low state of charge battery when above the 50% state of charge (e.g. in this example, the threshold state of charge is a 50% state of charge, however the threshold state of charge may be any suitable value such as 40%, 60%, 70%, among other possibilities).

Furthermore, the charging of the block 1204 may occur such that, after charging, the main batteries 303 are all in a similar state of charge and/or in a high state of charge (e.g. when determining low or high state of charge of a main battery 303 is threshold based).

In a particular example, a main battery 303 may initially be capable of outputting 100 Amps of current (e.g. charge capacity), but over time power fade and/or capacity fade occurs and such a main battery 303 may capable of outputting only 50 Amps of current; however, another main battery 303 may be capable of outputting 100 Amps of current and may have to output more energy to power the motor 111 than the main battery 303 capable outputting only 50 Amps of current. Such a situation may place undue stress on the main battery 303 capable of outputting 100 Amps and indeed it is preferable, at the vehicle 100, that all the main batteries 303 be "matched" (e.g. with respect to state of charge) so that the main batteries 303 generally operate at similar currents and/or voltages and/or powers. As such, the controller 311 may control the notification device 328, and/or another notification device, to provide an indication to change a main battery 303 that has aged, relative to one or more other main batteries 303, such that the other main batteries 303 are stressed. Such relative aging may be defined in terms of a relative threshold aging condition such as a relative state of charge capacity, and the like; hence, for example when one main battery 303 reaches a maximum state of charge capacity that is 50% of other main batteries 303, the controller 311 may control the notification device 328, and/or another notification device, to provide an indication to change such a main battery 303 (e.g. that has met a relative threshold aging condition).

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

As should be apparent from this detailed description above, the operations and functions of computing devices, and the like, described herein are sufficiently complex as to require their implementation on a computer system, and cannot be performed, as a practical matter, in the human mind. Computing devices, and the like, such as set forth herein are understood as requiring and providing speed and accuracy and complexity management that are not obtainable by human mental steps, in addition to the inherently digital nature of such operations (e.g., a human mind cannot interface directly with a Random Access Memory, or other digital storage, cannot transmit or receive electronic messages and/or information, electronically encoded video, electronically encoded audio, etc., among other features and functions set forth herein).

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more embodiments. The scope, therefore, is only to be limited by the claims appended hereto.

What is claimed is:

1. A vehicle comprising:
   a motor;
   a motor controller configured to: control the motor; and detect when the motor is generating current;
   main batteries configured to: provide power to the motor via the motor controller; and monitor respective states of charge thereof;
   intermediate batteries configured to: store regeneration power generated via the current generated by the motor;
   switches to: control connections between the motor controller, the main batteries and the intermediate batteries; and
   a controller in communication with the motor controller, the switches, and the main batteries, the controller configured to:
      based on the respective states of charges of the main batteries, control the switches to:
         disconnect one or more of the main batteries from the motor controller while a given number of the main batteries continue to provide the power to the motor via the motor controller; and
         connect the one or more of the main batteries to the intermediate batteries until the respective states of charges of the main batteries are within a given range.

2. The vehicle of claim 1, wherein the controller is further configured to:
   in response to determining that a given main battery, of the main batteries, has a respective of charge below a threshold state of charge control the switches to:
      disconnect the given main battery from the motor controller;
      connect the given main battery to the intermediate batteries until the state of charge of the given main battery is within the given range; and thereafter,
      reconnect the given main battery to the motor controller.

3. The vehicle of claim 2, wherein the threshold state of charge is different from the given range.

4. The vehicle of claim 1, wherein the given range is based on respective current states of charges of the given number of the main batteries that continue to provide the power to the motor via the motor controller while the one or more main batteries are being charged.

5. The vehicle of claim 1, wherein the controller is further configured to: in response to determining that the motor is not generating the current, control the switches to connect the main batteries to the motor controller and disconnect the intermediate batteries from the motor controller.

6. The vehicle of claim 1, wherein the controller is further configured to: in response to determining that the motor is generating the current, control the switches to disconnect the main batteries from the motor controller and connect the intermediate batteries to the motor controller to charge the intermediate batteries.

7. The vehicle of claim 1, wherein the controller is further configured to: in response to determining that the motor is generating the current, and that the current being generated is below a threshold current: control the switches to connect one or more of the main batteries and the intermediate batteries to the motor controller to charge one or more of the main batteries and the intermediate batteries.

8. The vehicle of claim 1, wherein the controller is further configured to: in response to determining that the motor is generating the current: control the switches to charge one or more of the main batteries and the intermediate batteries based on respective current capacities of the main batteries and the intermediate batteries.

9. The vehicle of claim 1, wherein the controller is further configured to: based on the respective states of charge of the main batteries meeting one or more given conditions: communicate with the motor controller to reduce the power used by the motor.

10. The vehicle of claim 1, wherein the controller is further configured to: based on the respective states of charge of the main batteries meeting one or more given conditions: control a notification device to provide a notification of the one or more given conditions that is met.

11. A method comprising:
   at a vehicle comprising: a motor; a motor controller configured to: control the motor; and detect when the motor is generating current; main batteries configured to: provide power to the motor via the motor controller; and monitor respective states of charge thereof; intermediate batteries configured to: store regeneration power generated via the current generated by the motor; switches to: control connections between the motor controller, the main batteries and the intermediate batteries; and a controller in communication with the motor controller, the switches, and the main batteries,
based on the respective states of charges of the main batteries, controlling, via the controller, the switches to:
disconnecting one or more of the main batteries from the motor controller while a given number of the main batteries continue to provide the power to the motor via the motor controller; and
connecting the one or more of the main batteries to the intermediate batteries until the respective states of charges of the main batteries are within a given range.

12. The method of claim 11, further comprising:
in response to determining that a given main battery, of the main batteries, has a respective of charge below a threshold state of charge control the switches to:
disconnecting the given main battery from the motor controller;
connect the given main battery to the intermediate batteries until the state of charge of the given main battery is within the given range; and thereafter,
reconnect the given main battery to the motor controller.

13. The method of claim 12, wherein the threshold state of charge is different from the given range.

14. The method of claim 11, wherein the given range is based on respective current states of charges of the given number of the main batteries that continue to provide the power to the motor via the motor controller while the one or more main batteries are being charged.

15. The method of claim 11, further comprising: in response to determining that the motor is not generating the current, controlling the switches to connect the main batteries to the motor controller and disconnect the intermediate batteries from the motor controller.

16. The method of claim 11, further comprising: in response to determining that the motor is generating the current, controlling the switches to disconnect the main batteries from the motor controller and connect the intermediate batteries to the motor controller to charge the intermediate batteries.

17. The method of claim 11, further comprising: in response to determining that the motor is generating the current, and that the current being generated is below a threshold current: controlling the switches to connect one or more of the main batteries and the intermediate batteries to the motor controller to charge one or more of the main batteries and the intermediate batteries.

18. The method of claim 11, further comprising: in response to determining that the motor is generating the current: controlling the switches to charge one or more of the main batteries and the intermediate batteries based on respective current capacities of the main batteries and the intermediate batteries.

19. The method of claim 11, further comprising: based on the respective states of charge of the main batteries meeting one or more given conditions: communicating with the motor controller to reduce the power used by the motor.

20. The method of claim 11, further comprising: based on the respective states of charge of the main batteries meeting one or more given conditions: controlling a notification device to provide a notification of the one or more given conditions that is met.

* * * * *